(12) United States Patent
Shimizu et al.

(10) Patent No.: US 6,609,162 B1
(45) Date of Patent: Aug. 19, 2003

(54) DATA PROCESSING APPARATUS CONNECTED TO A NETWORK CONNECTABLE A PLURALITY OF DEVICES

(75) Inventors: Hideaki Shimizu, Yokohama (JP); Makoto Takayama, Yokohama (JP); Koji Kajita, Yokohama (JP); Akira Negishi, Fujisawa (JP); Masahito Yamamoto, Tokyo (JP); Shin Muto, Kawasaki (JP); Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/324,512

(22) Filed: Jun. 3, 1999

(30) Foreign Application Priority Data

Jun. 9, 1998 (JP) ............................................. 10-175313
Jul. 30, 1998 (JP) ............................................. 10-216126

(51) Int. Cl.⁷ ................................................. G06F 3/00
(52) U.S. Cl. ......................... 710/15; 709/203; 709/229
(58) Field of Search ............................... 709/205, 217, 709/218, 219, 223–229, 238; 710/15, 17, 18

(56) References Cited

U.S. PATENT DOCUMENTS 5,768,516 A    6/1998  Sugishima ............. 395/200.47
5,987,535 A  * 11/1999  Knodt ........................... 700/83
6,122,684 A  *  9/2000  Sakura ........................ 358/450
6,262,805 B1 *  7/2001  Ishikawa et al. ........... 358/1.14

FOREIGN PATENT DOCUMENTS

| EP | 0 602 786 A2 | 10/1993 |
| EP | 0 812 091 A2 | 12/1997 |
| WO | WO 98/00788 | 1/1998 |
| WO | WO 98/17032 | 4/1998 |

* cited by examiner

Primary Examiner—Jeffrey Gaffin
Assistant Examiner—Eron Sorrell
(74) Attorney, Agent, or Firm—Fitzpatrick, Cella, Harper & Scinto

(57) ABSTRACT

In a network connecting a plurality of devices, the image processing function of each device, information for specifying each device, and the like are collected and controlled, and functions realizable by combining two or more devices are determined. Profiles indicating respective combinations are transferred to each device. Each device which has received the profiles displays executable functions based on the profiles, and performs control, such as the operation of the device, transfer of data, and the like, in order to realize a function selected from among the displayed functions.

16 Claims, 27 Drawing Sheets

FIG.5

| | |
|---|---|
| Device-Type: | input-device/scanner |
| Device-id: | ScannerXXX |
| Device-address: | 172.16.10.2 |
| Resolution: | 400,600,1200 |
| Media-size: | A4,A5,B4 |
| Input-speed: | A4-20sec |
| Input-fee: | A4-16bit/8yen |
| Document-format: | JPEG,GIF,LIPS4 |
| Input-command: | A4/REQ A4-SCAN, A5/REQ A5-SCAN, B4/REQ B4-SCAN |

FIG.6

| | |
|---|---|
| Device-Type; | output-device/LBP |
| Device-id; | LBP-XXX |
| Device-address; | 172.16.10.3 |
| Resolution; | 300,600 |
| Media-size; | LTR,LTRR,LGL,A4,A5,B4 |
| Cassette; | 1.LTRR<br>2.LGL |
| Output-speed; | LTR-6sec |
| Output-fee; | LTR-MONO/10yen |
| Document-format; | LIPS4,N201,ESC/P |
| Option; | None |

FIG.7

| | |
|---|---|
| Device-Type; | output-device/LBP |
| Device-id; | GP-XXX |
| Device-address; | 172.16.10.2 |
| Resolution; | 300,600 |
| Media-size; | LTR,LTRR,LGL,STMT |
| Cassette; | 1.LTRR<br>2.LGL<br>3.LGL<br>4.LTR<br>5.STMT<br>6.LGLR |
| Output-speed; | LTR-32sec |
| Output-fee; | LTR-MONO/10yen |
| Document-format; | LIPS4,N201,ESC/P |
| Option; | 20bin-Staple-Sorter<br>TwoSidePrintUnit |

FIG.9

REQ DEVICE-PROFILE

FIG.10

```
SEND DEVICE-PROFILE

Device-Type:        input-device/scanner

Device-id:          ScannerXXX

Device-address:     172.16.10.2

Resolution:         400,600,1200

Media-size:         A4,A5,B4

Input-speed:        A4-20sec

Input-fee:          A4-16bit/8yen

Document-format:    JPEG,GIF,LIPS4

Input-command:      A4/REQ A4-SCAN,
                    A5/REQ A5-SCAN,
                    B4/REQ B4-SCAN

END_OF_PROFILE
```

FIG.12

| | |
|---|---|
| Description: | COPY scannerXXX to LBP-XXX |
| input-device: | Scanner |
| output-device: | LBP |
| input-address: | 172.16.10.1 |
| output-address: | 172.16.10.2 |
| Document-format: | LIPS4 |
| Copy-default: | 1 |
| Resolution: | 600dpi |
| Input-command: | A4/REQ A4-SCAN, A5/REQ A5-SCAN, B4/REQ B4-SCAN |

FIG.14

REQ TRANSFER-PATH-PROFILE

FIG.15

| | |
|---|---|
| SEND TRANSFER-PATH-PROFILE | |
| Description: | COPY scannerXXX to LBP-XXX |
| input-device: | Scanner |
| output-device: | LBP |
| input-address: | 172.16.10.1 |
| output-address: | 172.16.10.2 |
| Document-format: | LIPS4 |
| Copy-default: | 1 |
| Resolution: | 600dpi |
| Input-command: | A4/REQ A4-SCAN, A5/REQ A5-SCAN, B4/REQ B4-SCAN |
| END_OF_PROFILE | |

DATA PROCESSING APPARATUS CONNECTED TO A NETWORK CONNECTABLE A PLURALITY OF DEVICES

BACKGROUND OF THE INVENTION

1. Field of the Invention

The present invention relates to a data processing apparatus capable of performing processing by combining a plurality of devices connected to a network connectable a plurality of devices, and a method for controlling the data processing apparatus.

2. Description of the Related Art

A large number of multifunction peripheral systems (hereinafter abbreviated as "MFP systems") have been realized, in which image input devices, such as scanners, digital cameras and the like, and image output devices, such as facsimile devices and the like, are interconnected via a network, and a plurality of functions are realized by combining an image input apparatus with an image output apparatus.

Such an MFP system requires a file server for temporarily storing data on a network, and a client host apparatus (also operating, in some cases, as a file server) for instructing data reading from an image input device and data transmission to an image output device.

For example, when realizing a copying function by combining a scanner, serving as an image input device, with a printer, serving as an image output device, the user first goes to a location where the scanner is present, sets an original to be copied on the scanner, and then moves to a location where the client host apparatus is present in order to instruct reading of data of the original by the scanner. The copying function can be realized by instructing output to the printer upon completion of reading of the data of the original.

In the above-described conventional approach, however, in order to realize a desired function (such as a network scanner, a copying function, a binding function, a facsimile function or the like), it is necessary for the user to move to a location where the client host apparatus is present, and instruct, for example, scanning by the scanner, printing by the printer, and facsimile transmission/reception by a facsimile device, after starting application programs for realizing respective functions (such as an application program for the scanner, an application program for opening an image file, and the like). Furthermore, it is difficult for the user to have information relating to each function which can be realized by combining devices connected to the network. In general, only some of the network controllers can have such information.

SUMMARY OF THE INVENTION

It is an object of the present invention to provide a data processing apparatus in which the above-described problems are solved, and a method for controlling the data processing apparatus.

It is another object of the present invention to provide a data processing apparatus capable of easily grasping realizable functions via a network, and a method for controlling the data processing apparatus.

It is still another object of the present invention to provide a data processing apparatus capable of easily selecting realizable functions via a network, and a method for controlling the data processing apparatus.

It is yet another object of the present invention to provide a data processing apparatus having an improved operability which can use a realizable function via a network as if the function is provided by a single device.

According to one aspect of the present invention, a controlling method in a data processing system having a plurality of data processing terminals includes a gathering step of gathering function information indicating a function of each of the plurality of data processing terminals from a corresponding one of the plurality of data processing terminals, a producing step of producing a setting indicating each function realizable by combining some of the plurality of data processing terminals based on the function information gathered in the gathering step, and a transferring step of transferring the setting produced in the producing step to at least one of the plurality of data processing terminals.

According to another aspect of the present invention, a data processing apparatus includes connection means for connecting an external device, receiving means for receiving function information indicating a function of the external device connected via the connection means, and display means for displaying a function realizable by combination with the external device based on the function information received by the receiving means.

According to still another aspect of the present invention, a method for controlling a data processing apparatus connectable an external device includes a receiving step of receiving function information indicating a function of the external device connected to the data processing apparatus, and a displaying step of displaying a function realizable by combining the data processing apparatus with the external device connected to the data processing apparatus based on the function information received in the receiving step.

According to yet another aspect of the present invention, a computer readable program, stored in a storage medium, for controlling a data processing apparatus connectable an external device includes a receiving step of receiving function information indicating a function of the external device connected to the data processing apparatus, and a displaying step of displaying a function realizable by combining the data processing apparatus with the external device connected to the data processing apparatus based on the function information received in the receiving step.

The foregoing and other objects, advantages and features of the present invention will become more apparent from the following description of the preferred embodiment taken in conjunction with the accompanying drawings.

BRIEF DESCRIPTION OF THE DRAWINGS

FIG. 5 is a diagram illustrating a device profile of the scanner 102;

FIG. 6 is a diagram illustrating a device profile of the printer 2903;

FIG. 7 is a diagram illustrating a device profile of a printer 2095 shown in FIG. 1;

FIG. 9 is a diagram illustrating an example of the structure of a command to transfer a device profile which is provided for each apparatus on the network;

FIG. 10 is a diagram illustrating an example of the structure of a device profile transmitted from each apparatus via a network 101 shown in FIG. 1;

FIG. 12 is a diagram illustrating an example of the structure of a transfer-path profile generated by a transfer-path-profile generation unit 409 shown in FIG. 4;

FIG. 14 is a diagram illustrating an example of the structure of a command to transfer a transfer-path profile;

FIG. 15 is a diagram illustrating an example of the structure of a transmission-path profile transferred to each apparatus in response to a command to transfer a transfer-path profile;

DESCRIPTION OF THE PREFERRED EMBODIMENTS

As will be described in detail below, in a preferred embodiment of the present invention, transfer-path information indicating all functions realizable by any combination of image input devices and image output devices which are currently connected to a network is formed based on information (device information) relating to the function of each of the image input devices and image output devices, and the transfer-path information can be displayed on a display picture frame of each of the image input devices and image output devices. It is thereby possible to display on a display picture frame of each of the devices not only the function of that device itself but also all functions which can be realized by combination with another device on the network, and the user can use a "virtual device" obtained by combining devices on the network as if it were a single device without being aware of the combination of the devices. At that time, only functions realizable by combining devices are displayed instead of displaying the functions of all other devices.

In this embodiment, the "virtual device" operates as if it were a single device by combining a plurality of devices, for example, as in a case in which facsimile transmission is performed by using a network scanner as a scanner of a facsimile device capable of performing facsimile transmission which is present on a common network even if only the network scanner is present on the network, or in a case in which binding processing is performed in printing by transmitting image data from a scanner present at hand to a high-speed printer installed in a copying room.

The embodiment will now be described in detail with reference to the drawings.

Figure 1:
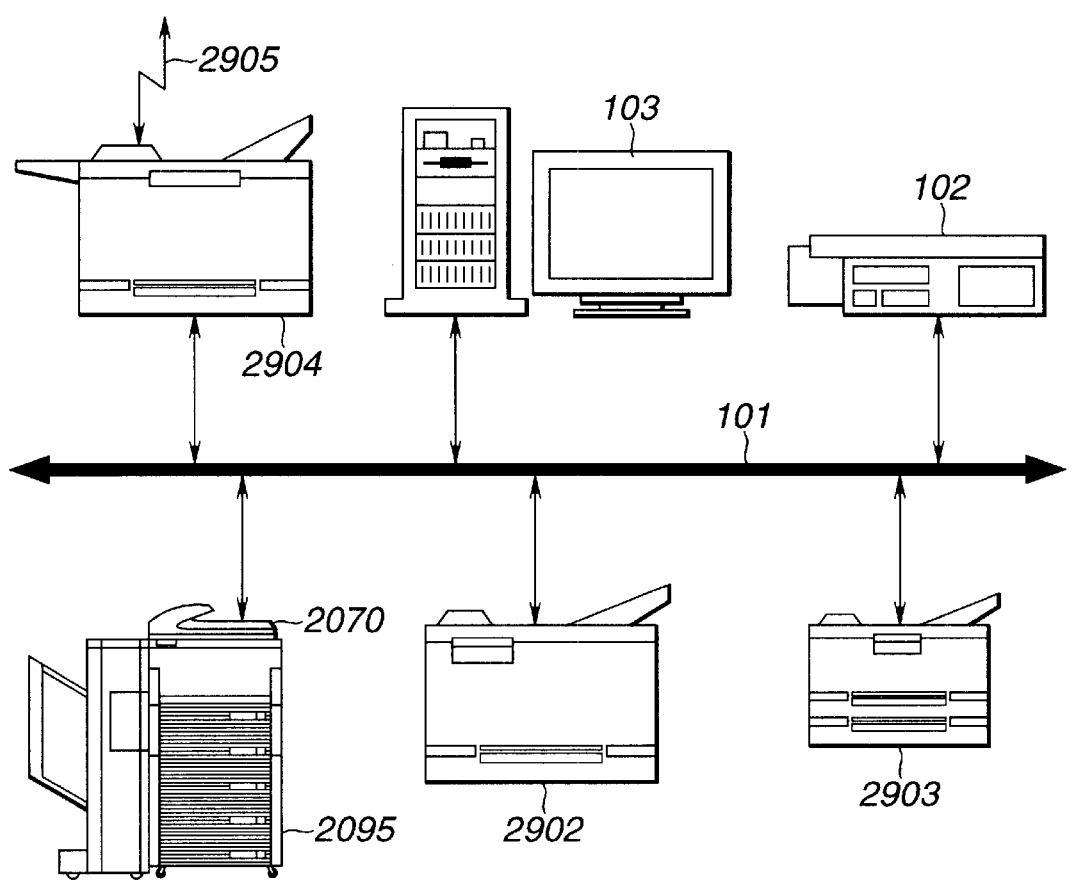
FIG. 1 is a block diagram illustrating the entire configuration of a multifunction peripheral system according to an embodiment of the present invention.

FIG. 1 is a block diagram illustrating the entire configuration of a multifunction peripheral system (hereinafter termed an "MFP system") according to the embodiment.

In FIG. 1, a network 101 uses a known technique of connecting a plurality of devices (to be described below), such as Ethernet using TCP/IP (Transmission Control Protocol/Internet Protocol).

A network scanner (hereinafter abbreviated as a "scanner") 102 optically reads an image printed on a sheet while scanning the sheet, and generates image data representing the image. The scanner 102 includes a network interface (not shown), and is connected to respective devices via the network 101 so as to transmit the generated image data to the devices. In this embodiment, the scanner 102 is a color scanner which can obtain the read image data as color data for three colors, i.e., R (red), G (green) and B (blue).

A control server 103 generates function information used when constructing a virtual multifunction peripheral (hereinafter abbreviated as "MFP") system having a plurality of functions which can be realized by combining the scanner 102, network printers 2095, 2902 and 2903, and a network facsimile device 2904 (hereinafter termed a "transfer-path profile"), and provides the transfer-path profile in response to a request from an image input device, an image output device or the like connected to the network 101. The control server 103 is usually realized by introducing server software in a personal computer or a work station. The control server 103 includes a network interface, and is connected to the respective devices via the network 101.

Each of the network printers (hereinafter abbreviated as the "printers") 2095, 2902 and 2903 includes a network interface (not shown), and receives printing data and image data transmitted via the network 101 and prints an image represented by the image data on a medium, such as paper or the like, using a known printing technique, such as an electrophotographic technique or the like. Each of the printers 2095, 2902 and 2903 is connected to the respective devices via the network 101. In this embodiment, the printer 2095 is a black-and-white digital composite device, the printer 2902 is a color laser-beam printer, and the printer 2903 is a black-and-white laser-beam printer.

The facsimile device 2904 includes a network interface, and transmits/receives image data via a public network 2905. The facsimile device 2904 also operates as an interface between the system and the public network for transmitting image data read by the scanner 102, and transferring received image data to the printer 2095, 2902 or 2903 in order to print an image represented by the image data, and outputting image data converted in the form of a file by the control server 103 to the public network 2905.

In this embodiment, image data read by the scanner 102 can be subjected to printing by being transmitted to the printer 2095, 2902 or 2903 without being modified. The image data may also be transmitted to the printer and subjected to printing after being converted into a page discription language (hereinafter abbreviated as a "PDL").

Figure 2:
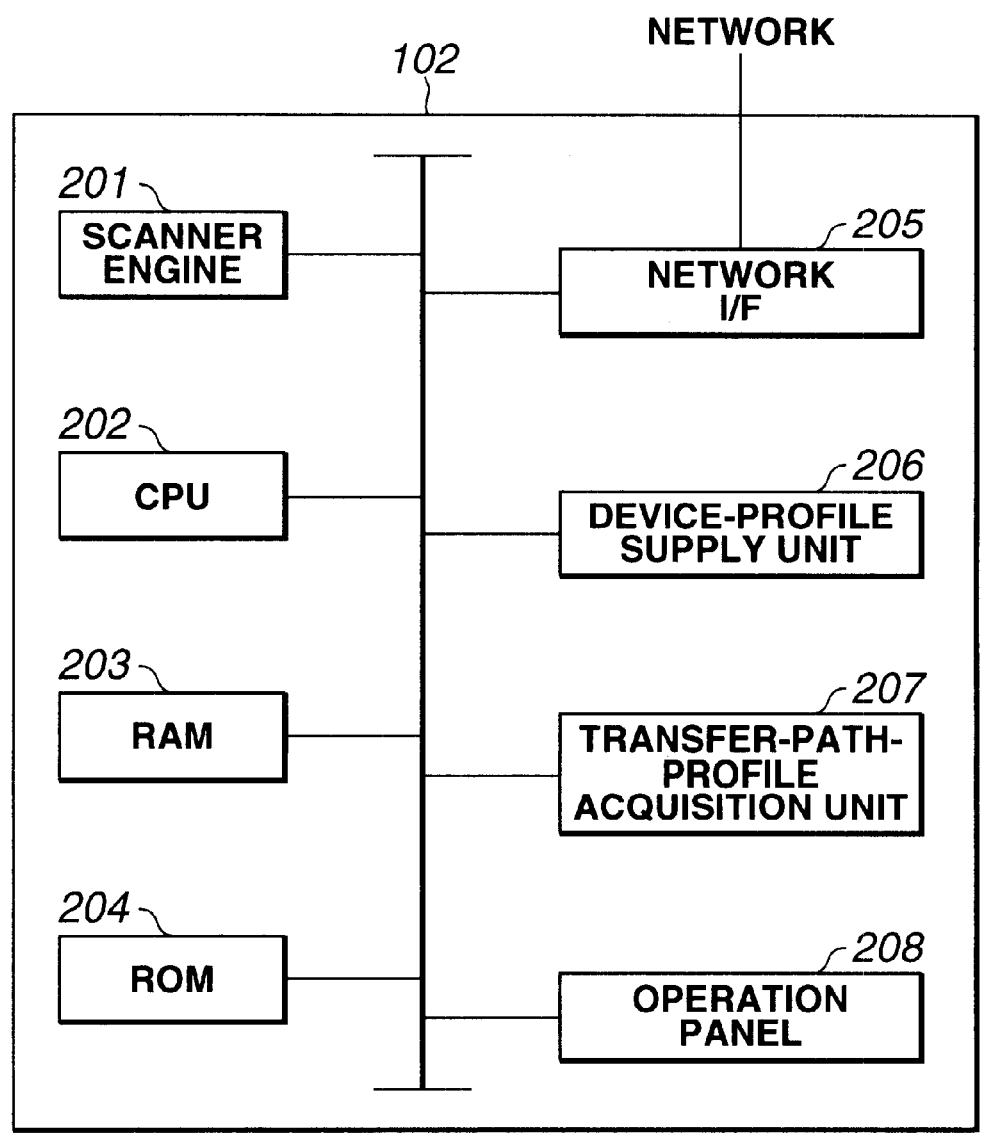
FIG. 2 is a schematic diagram illustrating the configuration of a scanner 102 shown in FIG. 1.

FIG. 2 is a schematic block diagram illustrating the configuration of the scanner 102.

In FIG. 2, the scanner 102 includes as main components a scanner engine 201 which utilizes a known optical reading technique, a central processing unit (hereiafter abbreviated as a "CPU") 202 for controlling the entire operation of the scanner 102, a ROM (read-only memory) 204 storing control programs to be executed by the CPU 202, a network interface (I/F) 205 connected to the network 101, a device-profile supply unit 206 for transmitting a device profile, serving as device information relating to the scanner 102, to the control server 103, a transfer-path-profile acquisition unit 207 for acquiring a transfer-path profile, serving as information (function information) relating to functions realizable in the system, from the control server 103, an operation panel 208, including display devices, such as a liquid-crystal display device, an LED (light-emitting diode) display device and the like, and a plurality of operation buttons, for providing a user interface, and a random access memory (hereinafter abbreviated as a "RAM") 203 for temporarily storing image data read by the scanner engine 201, a transfer-path profile acquired by the transfer-path-profile acquisition unit 207, and storage information for operation.

The black-and-white digital composite device 2095 also includes a scanner having the same configuration as that shown in FIG. 2.

Figure 3:
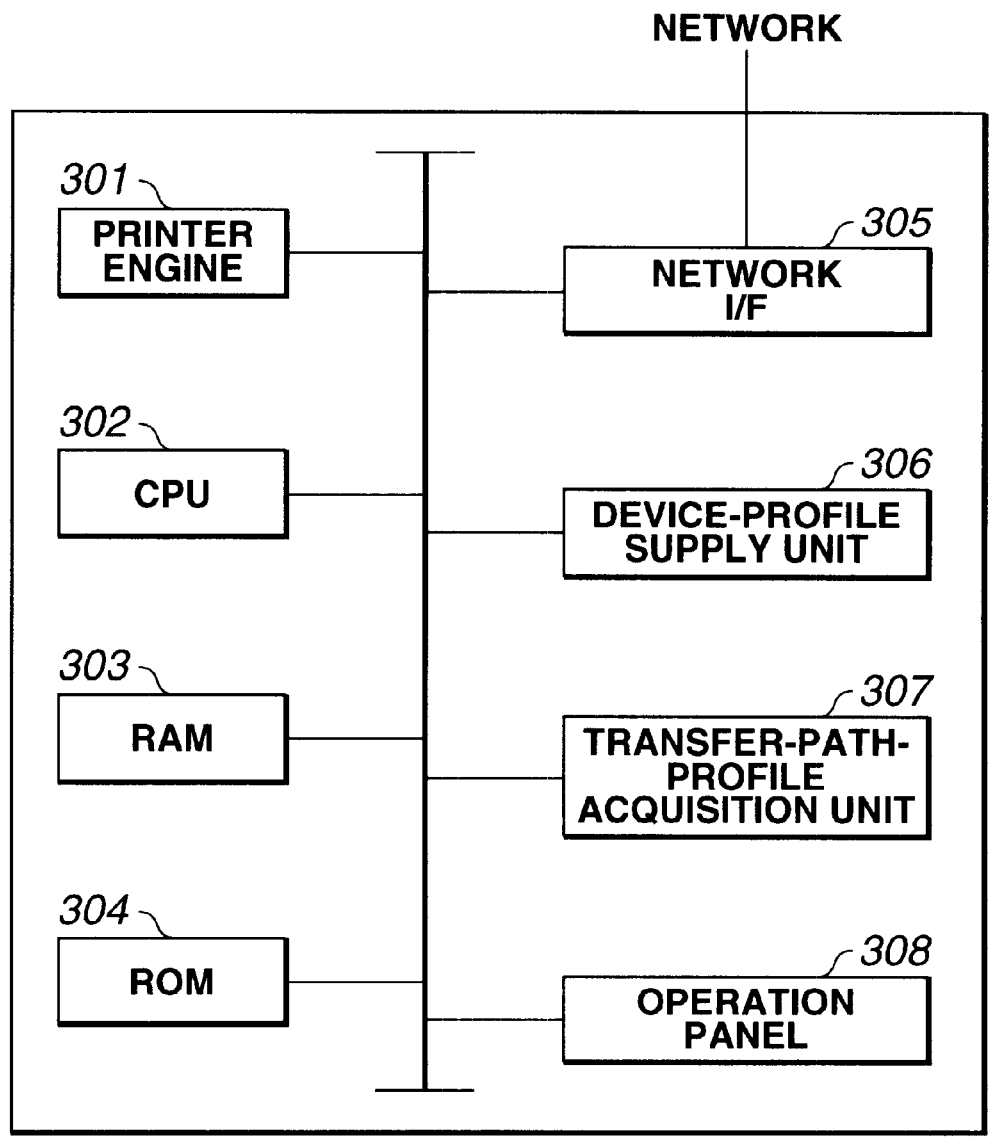
FIG. 3 is a schematic diagram illustrating the configuration of a printer 2903 shown in FIG. 1.

FIG. 3 is a schematic block diagram illustrating the configuration of the printer 2903.

In FIG. 3, the printer 2903 includes as main components a printer engine 301 which utilizes a known electrophotographic printing technique, a CPU 302 for controlling the entire operation of the printer 2903, a ROM 304 storing operation control programs to be executed by the CPU 302, a network interface (I/F) 305 connected to the network 101, a device-profile supply unit 306 for transmitting a device profile, serving as device information relating to the printer 2903, to the control server 103, a transfer-path-profile acquisition unit 307 for acquiring a transfer-path profile from the control server 103, an operation panel 308, including display devices, such as a liquid-crystal display device, an LED display device and the like, and a plurality of operation buttons, for providing a user interface, and a RAM 303 for temporarily storing image data to be subjected to printing by the printer engine 301, a transfer-path profile acquired by the transfer-path-profile acquisition unit 307, and storage information for operation.

The basic configuration of the printers 2095 and 2902 connected to the same network is the same as that of the printer 2903.

Figure 4:
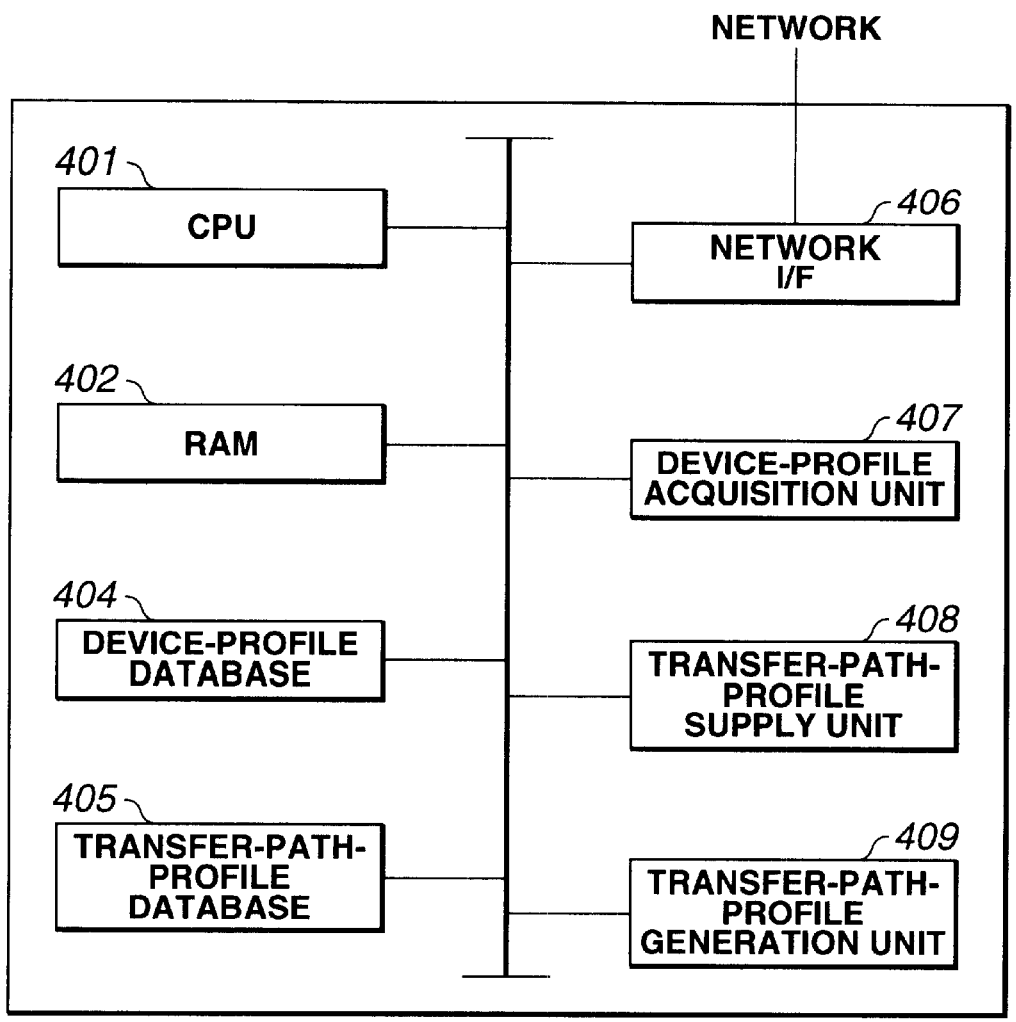
FIG. 4 is a schematic diagram illustrating the configuration of a control server 103 shown in FIG. 1.

FIG. 4 is a schematic block diagram illustrating the configuration of the control server 103.

In FIG. 4, the control server 103 includes as main components a CPU 401 for controlling the entire operation of the control server 103, a RAM 402 for storing storage information for operation and programs for controlling the operation of the CPU 401, a device-profile database 404 storing device profiles of devices connected to the network 101, a transfer-path-profile database 405 storing tranfer-path profiles generated based on the device profiles, a network I/F 406 connected to the network 101, a device-profile acquisition unit 407 for acquiring a device profile from a device connected to the network 101 and storing the acquired device profile in the device-profile database 404, a transfer-path-profile supply unit 408 for reading transfer-path profiles from the transfer-path-profile database 405 in accordance with a request from each device connected to the network 101 and supplying the device with the transfer-path profiles via the network 101, and a transfer-path-profile generation unit 409 for generating transfer-path profiles from the device profiles stored in the device-profile database 402 and writing the generated tranfer-path profiles in the transfer-path-profile database 405.

The control server 103 generates a transfer-path profile, serving as function information relating to a virtual MFP system obtained by combining the scanner 102, the printers 2903, 2095 and 2902 as described above, and controls the generated transfer-path profile. The transfer-path profile is generated based on the device profile of each device connected via the network 101.

The device profile will now be described.

The device profile is data indicating performances and features of each device which are necessary for constructing a virtual MFP system, and comprises, for example, data as shown in FIGS. 5–7.

FIG. 5 is a diagram illustrating a device profile of the scanner 102.

In FIG. 5, "Device-Type" is data indicating the type of the device, and, in the case of FIG. 5, indicates a scanner, serving as an image input device. "Device-id" is data indicating the model name of the device. In the case of FIG. 5, "ScannerXXX" indicates the model name of the scanner 102. "Device-address" indicates the network address of the device. In the case of FIG. 5, "172.16.10.2" indicates the network address of the scanner 102. "Resolution" is data indicating resolution levels supported by the device. In the case of FIG. 5, it is indicated that the scanner 102 supports resolution levels of 400 dpi (dots per inch), 600 dpi and 1200 dpi. "Media-Size" is data indicating sheet sizes supported by the device. In the case of FIG. 5, it is indicated that the scanner 102 supports sheet sizes of A4, A5 and B4. "Input-speed" is data indicating the printing speed of the device. In the case of FIG. 5, it is indicated that the printing speed of the scanner 102 for an A4-size sheet is 20 seconds per sheet. "Input-fee" is data indicating a fee when using the device. In the case of FIG. 5, it is indicated that a fee of 8 yens is claimed when reading A4-size 16-bit image data using the scanner 102. "Document-format" is data indicating image formats supported by the device. In the case of FIG. 5, it is indicated that the scanner 102 supports image output formats according to JPEG and GIF methods, and an image output format using a PDL (process design language) according to a LIPS4 method. "Input-command" is data indicating a command used when another device causes the scanner 102 to execute reading of image data via the network 101. In the case of FIG. 5, it is indicated that, for example, when causing reading of image data with the A4 size, a command "REQA4-SCAN" is to be transmitted to the scanner 102.

FIG. 6 is a diagram illustrating a device profile of the printer 2903.

In FIG. 6, "Device-Type" is data indicating the type of the device, and, in the case of FIG. 6, indicates a laser-beam printer (LBP), serving as an image output device. "Device-id" is data indicating the model name of the device.

In the case of FIG. 6, "LBP-XXX" indicates the model name of the printer 2903. "Device-address" indicates the network address of the device. In the case of FIG. 6, "172.16.10.3" indicates the network address of the printer 2903. "Resolution" is data indicating resolution levels supported by the device. In the case of FIG. 6, it is indicated that the printer 2903 supports resolution levels of 300 dpi and 600 dpi. "Media-size" is data indicating sheet sizes supported by the device. In the case of FIG. 6, it is indicated that the printer 2903 supports sheet sizes of Letter, Letter-R, Legal, A4, A5 and B4. "Cassette" is data indicating the stage of each sheet cassette provided in the device and the size of sheets accommodated in the stage. In the case of FIG. 6, it is indicated that LetterR-size sheets and Legal-size sheets are accommodated in upper and lower stages, respectively, of the printer 2903. "Output-speed" is data indicating the printing speed of the device. In the case of FIG. 6, it is indicated that printing output on a Letter-size sheet requires 6 seconds per sheet. "Output-fee" is data indicating a fee when using the device. In the case of FIG. 6, it is indicated that a fee of 10 yens per page is claimed when a black-and-white image is subjected to printing output on a Letter size sheet. "Document-format" is data indicating image formats supported by the device. In the case of FIG. 6, it is indicated that the printer 2903 supports image output formats using PDLs according to LIPS4, N201 and ESC IP methods. "Option" indicates information relating to optional devices connected to the printer. In the case of FIG. 6, it is indicated that no optional device is connected to the printer 2903.

FIG. 7 is a diagram illustrating a device profile of the printer 2095.

In FIG. 7, "Device-Type" is data indicating the type of the device, and, in the case of FIG. 7, indicates that the printer 2095 is a laser-beam printer (LBP), serving as an output device. "Device-id" is data indicating the model name of the device. In the case of FIG. 7 "GP-XXX" indicates the model name of the printer 2095. "Device-address" indicates the network address of the device. In the case of FIG. 7, "172.16.10.4" indicates the network address of the printer 2095. "Resolution" is data indicating resolution levels supported by the device. In the case of FIG. 7, it is indicated that the printer 2095 supports resolution levels of 300 dpi and 600 dpi. "Media-size" is data indicating sheet sizes supported by the device. In the case of FIG. 7, it is indicated that the printer 2095 supports sheet sizes of Letter, Letter-R, Legal, Legal-R and Statement. "Cassette" is data indicating the stage of each sheet cassette provided in the device and the size of sheets accommodated in the stage. In the case of FIG. 7, it is indicated that Letter-R-size sheets, Legal-size sheets, Letter-size sheets, Statement-size sheets, and Legal-R-size are accommodated in the first, second and third, fourth, fifth and sixth stages, respectively, of the printer 2095. "Output-speed" is data indicating the printing speed of the device. In the case of FIG. 7, it is indicated that printing output on a Letter-size sheet requires 32 seconds per sheet. "Output-fee" is data indicating a fee when using the device. In the case of FIG. 7, it is indicated that a fee of 10 yens per page is claimed when a black-and-white image is subjected to printing output on a Letter size sheet. "Document-format" is data indicating image formats supported by the device. In the case of FIG. 7, it is indicated that the printer 2095 supports image output formats using PDLs according to LIPS4, N201 and ESC/P methods. "Option" indicates information relating to optional devices connected to the printer 2095. In the case of FIG. 7, it is indicated that a 20-bin sorter having a stapling function and a two-side unit for performing two-sided printing are provided.

Device profiles as shown in FIGS. 5–7 are acquired by the device-profile acquisition unit 407 of the control server 103.

Figure 8:
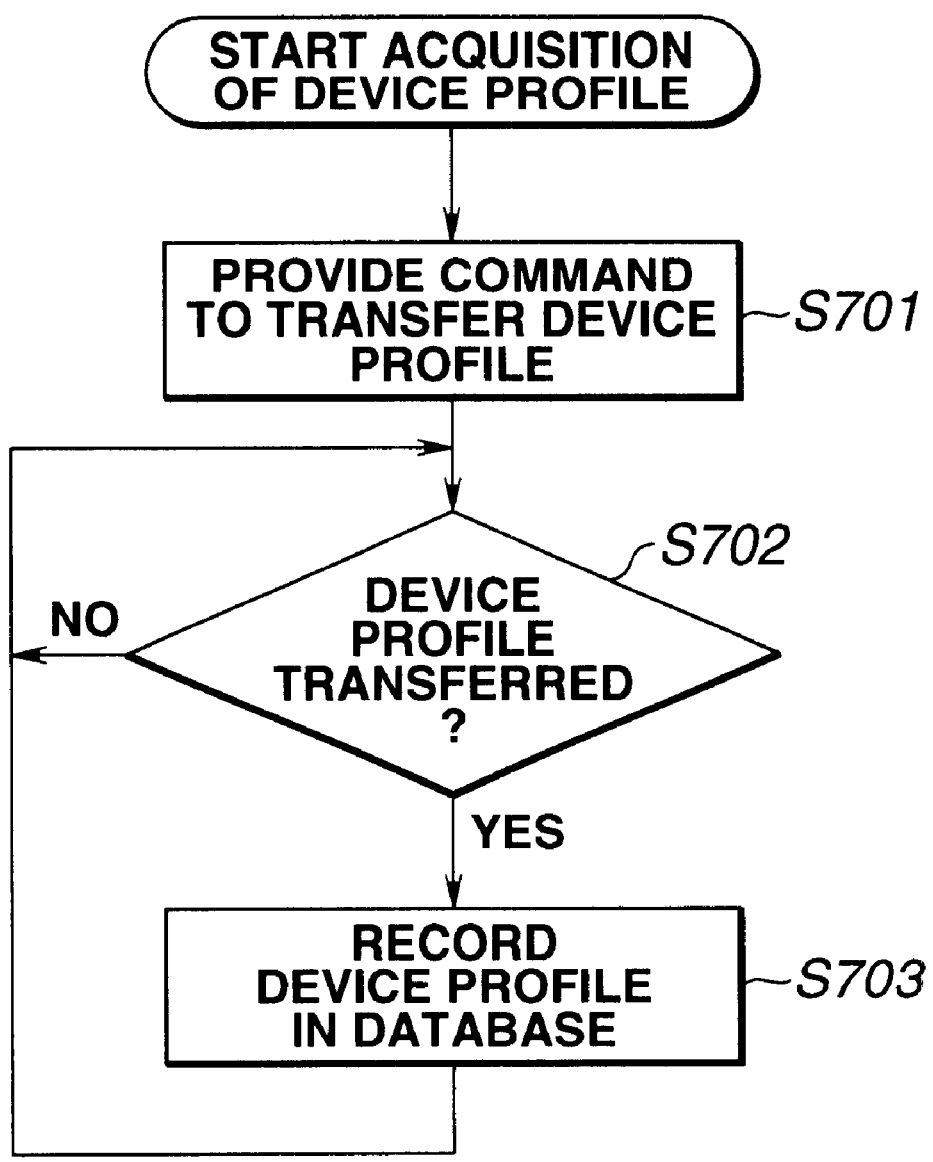
FIG. 8 is a flowchart illustrating the operation of a device-profile acquisition unit 407 of the control server 103 shown in FIG. 4.

FIG. 8 is a flowchart illustrating a procedure for acquiring a device profile performed by the device-profile acquisition unit 407 of the control server 103.

The device-profile acquisition unit 407 is started when the control server 103 has been started, and operates until the system of the control server 103 is terminated.

First, the device-profile acquisition unit 407 transmits a command to transfer a device profile to each device connected to the network 101 (step S701).

Figure 9:
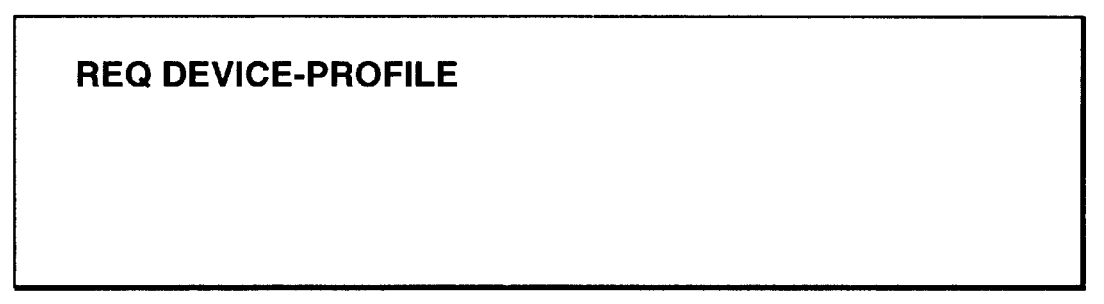

FIG. 9 is a diagram illustrating an example of the structure of a command to transfer a device profile transmitted to each device transmitted in step S701.

In FIG. 9, "REQ" indicates that the command is a transfer command, and "Device-Profile" indicates that data to be transferred is a device profile. That is, it is indicated that the command shown in FIG. 9 is a command to transfer a device profile. This command to transfer a device profile is subjected to broadcast communication with respect to the network in the form of UDP packets using TCP/IP.

Returning to FIG. 8, it is then determined if a device profile is transferred from each device (step S702). If the result of the determination in step S702 is negative, the procedure of step S702 is repeated. If the result of the determination in step S702 is affirmative, the transferred device profile is recorded in the device-profile database 404 (step S703). Upon completion of the processing in step S703, the process returns to the procedure in step S702.

FIG. 10 is a diagram illustrating an example of the structure of a device profile transferred from the scanner 102 to the control server 103 in the above-described step S702.

As shown in FIG. 10, the device profile to be transferred is provided by adding "SEND DEVICE-PROFILE" as information indicating tranfer of a device profile at the head of the device profile shown in FIG. 5, and "END OF PROFILE" as information indicating end of transferred data at the end of the device profile.

Next, a case of transferring a device profile from the scanner 102 to the control server 103 will be described. In the case of the scanner, transfer of a device profile is performed by the device-profile supply unit 206 shown in FIG. 2. The procedure for transferring the device profile of the printer 2903, 2095 or 2903 performed by the device-profile supply unit 206 is the same as the procedure for transferring the device profile of the scanner 102 performed by the device-profile supply unit 206.

Figure 11:
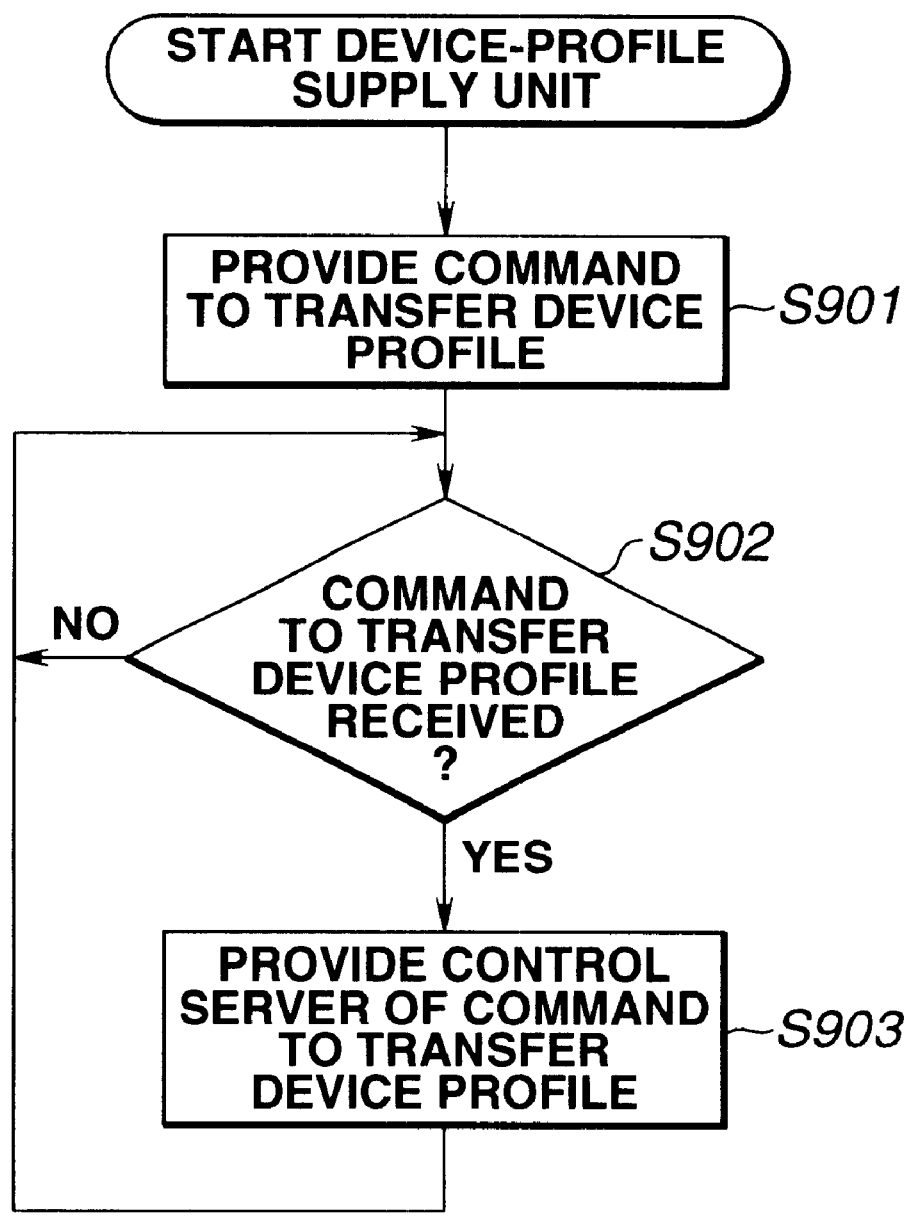
FIG. 11 is a flowchart illustrating the operation of a device-profile supply unit 206 shown in FIG. 2.

FIG. 11 is a flowchart illustrating a device-profile transfer procedure performed by the device-profile supply unit 206.

The device-profile supply unit 206 is started when the scanner 102 has been started, and continues the following procedure until power supply to the scanner 102 is disconnected.

First, the device-profile supply unit 206 executes transfer of a device profile to the control server 103 when being started (step S901). At that time, when the control server 103 has been started, then, in step S702 shown in FIG. 8, the transferred device profile is acquired by the control server 103, and the result of the acquisition is reflected in the device-profile database 404. When the control server 103 has not been started, the transferred device profile is not reflected in the device-profile database 404 of the control server 103.

Then, it is determined if a command to transfer the device profile transmitted from the control server 103 has been received (step S902). If the result of the determination in step S902 is negative, the procedure of step S902 is repeated until the command is received.

If the result of the determination in step S902 is affirmative, the device profile is transmitted to the control server 103 (step S903). Upon completion of the processing of step S903, the processing of step S902 is again executed.

The processing of step S903 is performed in order to reflect device information in the device-profile database 404 of the control server 103 when the control server 103 has been started after starting the scanner 102. That is, by provision of the command to transfer the device profile in step S701 shown in FIG. 8 by the device-profile acquisition unit 407 of the control server 103, the control server 103 is always guaranteed to acquire the device profile of each device connected to the network 101. After acquiring the device profile, the control server 103 causes the transfer-path-profile generation unit 409 to generate a transfer-path profile based on device information written in the device-profile database 404. The generated transfer-path profile is stored in the transfer-path-profile database 405.

FIG. 12 is a diagram illustrating an example of the structure of a transfer-path profile generated by the transfer-path-profile generation unit 409.

As shown in FIG. 12, the transfer-path profile includes "Description" which is data indicating a character string to be displayed on the display unit of the concerned device when selecting the corresponding transfer path, "input-device" which is data indicating the type of the input device, "output device" which is data indicating the type of the output device, "input-address" which is data indicating the network address of the input device, "output-address" which is data indicating the network address of the output device, "Document format" which is data indicating the format of the document used in this transfer path, "Copy-default" which is data indicating the number of copies to be used in default setting, "Resolution" which is data indicating the resolution used in this transfer path, and "Input-command" which is information written in the device profile of the input device and is a command to cause the input device to read image data.

As described above, the tranfer-path profile stores configuration information indicating a virtual MFP obtained by combining an input device and an output device connected to the network 101. For example, the transfer-path profile shown in FIG. 12 indicates a transfer-path profile when realizing a copying function by combining the scanner 102, serving as the input device, with the printer 2095, serving as the output device.

Figure 13:
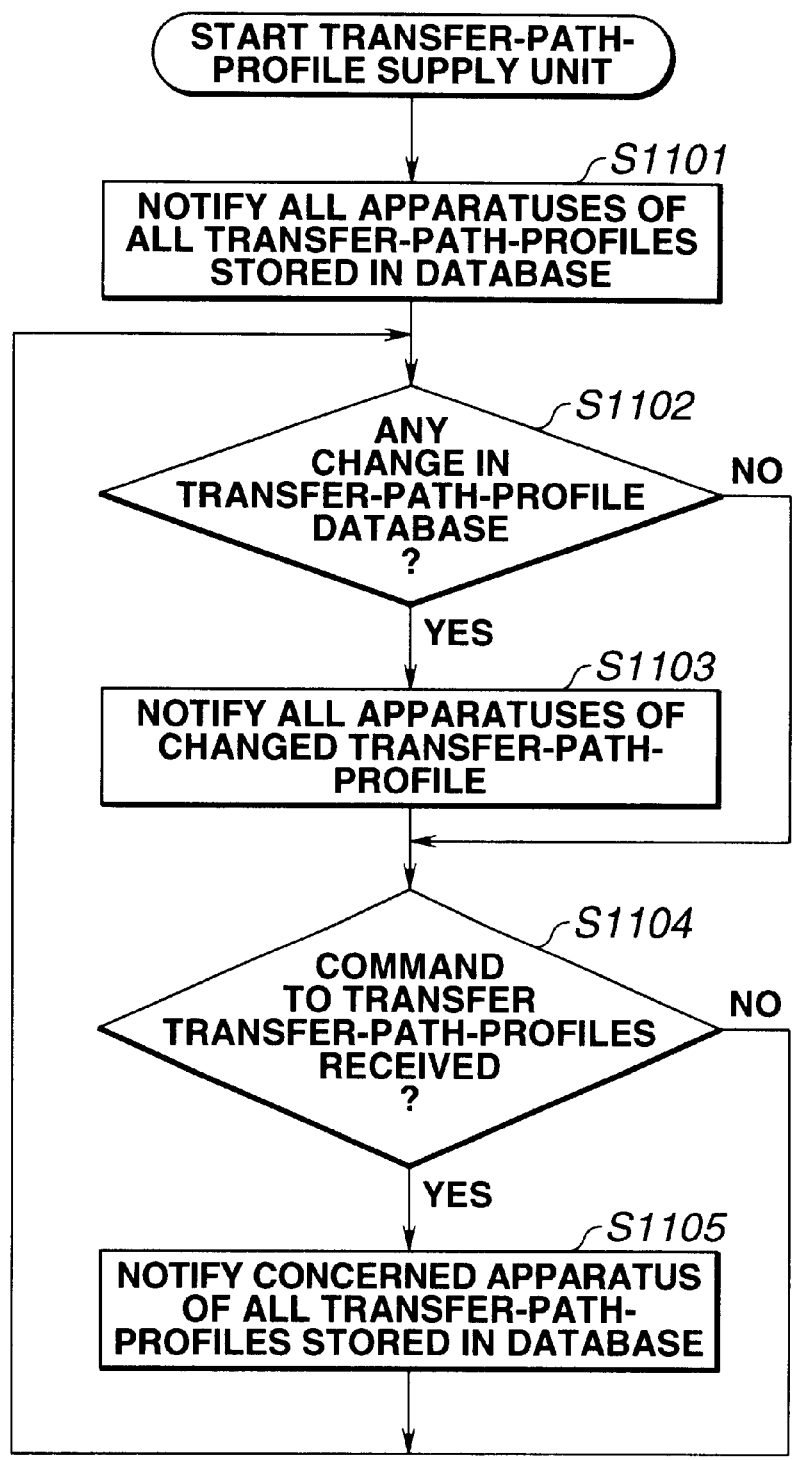
FIG. 13 is a flowchart illustrating the operation of a transfer-path-profile supply unit 408 within the control server 103 shown in FIG. 4.

The control server 103 usually possesses at least one transfer-path profile, and supplies each device with transfer-path profiles in response to a request from an input device or an output device connected to the network 101. FIG. 13 is a flowchart illustrating the operation of the transfer-path-profile supply unit 408 provided within the control server 103. The transfer-path-profile supply unit 408 starts the following operation when the control server 103 has been started.

When starting the control server 103, all transfer-path profiles stored in the transfer-path-profile database 405 are notified to all devices connected to the network 101 (step S1101). The notification of the transfer-path profiles is performed by broadcast notification.

Then, it is determined if there is a change in the transfer-path-profile database 405 (step S1102). If the result of the determination in step S1102 is affirmative, the changed transfer-path profile is notified to all devices connected to the network 101 (step S1103). The notification in step S1103 is also performed by broadcast notification.

If the result of the determination in step S1102 is negative, or after the changed transfer-path profile has been notified to all the devices connected to the network 101, it is determined if a command to transfer the transfer-path profiles transmitted from one of the devices has been received (step S1104). If the result of the determination in step S1104 is affirmative, the process proceeds to step S1105, where all the transfer-path profiles stored in the transfer-path-profile database 405 are notified to the device which has provided the command to transmit the transfer-path profiles. The command to transit the transfer-path profiles is transmitted from a device, which could not acquire the transfer-path profiles notified from the control server 103 in step S1101, for example, because the device has been started after the start of the control server 103, to the control server 103.

If the result of the determination in step S1104 is negative, or after completion of the transfer of the transfer-path profiles in step S1105, the process returns to step S1102, and the processing procedure from step S1102 to step S1105 is repeated.

Figure 14:
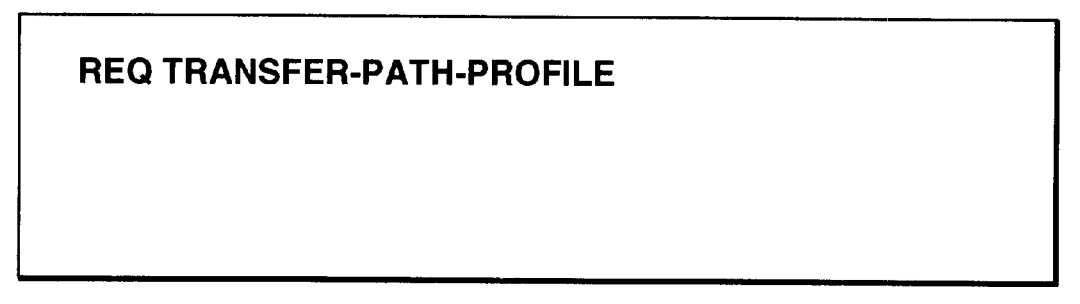

FIG. 14 is a diagram illustrating an example of the structure of a command to transfer a transfer-path profile. In FIG. 14, "REQ" indicates that this command is a transfer command, and "TRANFER-PATH-PROFILE" indicates that an object to be transferred by request of the command is a transfer-path profile.

FIG. 15 is a diagram illustrating an example of the structure of a transfer-path profile to be transferred from the control server 103 to each device in response to the command to transfer a transfer-path profile. As shown in FIG. 15, the transfer-path profile to be transferred is provided by adding "SEND TRANSFER-PATH-PROFILE" as information indicating tranfer of a tranfer-path profile at the head of the transfer-path profile shown in FIG. 12, and "END OF PROFILE" as information indicating end of transferred data at the end of the tranfer-path profile.

Next, a description will be provided of a procedure for acquiring transfer-path profiles by the transfer-path-profile acquisition unit 207 of the scanner 102. The procedure for acquiring transfer-path profiles by the transfer-path-profile acquisition unit 307 of the printer 2903, 2095 or 2903 is similar to the procedure for acquiring a transfer-path profiles by the transfer-path-profile acquisition unit 207 of the scanner 102.

Figure 16:
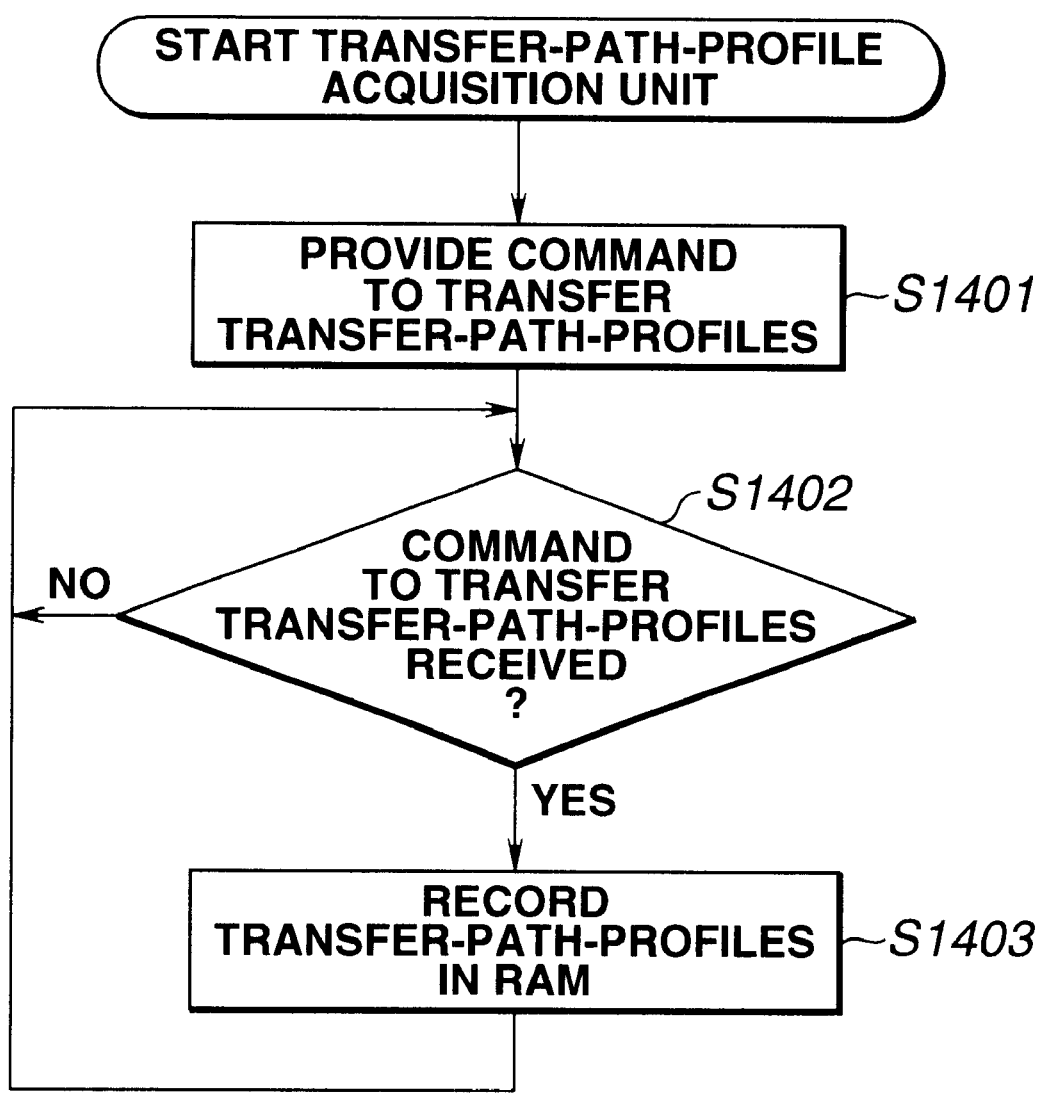
FIG. 16 is a flowchart illustrating the operation of a transmission-path-profile acquisition unit 207 of the scanner 102 shown in FIG. 2.

FIG. 16 is a flowchart illustrating the operation of the transfer-path-profile acquisition unit 207 of the scanner 102.

First, in order to acquire transfer-path profiles, the transfer-path-profile acquisition unit 207 provides the control server 103 with a command to transfer transfer-path profiles (step S1401). Upon reception of the command to transfer transfer-path profiles by the control server 103, the transfer-path-profile supply unit 408 transfers transfer-path profiles to a device which has transmitted the command to transfer transfer-path profiles, i.e., the scanner 102 (step S1105 shown in FIG. 13).

Then, it is determined if the transfer-path profiles have been received (step S1402). If the result of the determination in step S1402 is negative, the procedure of step S1402 is repeated until the transfer-path profiles are received. If the result of the determination in step S1402 is affirmative, the received transfer-path profiles are stored in the RAM 203 of the scanner 102, and the processing of step S1402 is resumed.

According to the above-described operation, each device connected to the network 101 can acquire the current transfer-path profiles from the control server 103. The acquired transfer-path profiles are stored in the RAM 203.

The operation shown in FIG. 16 may, for course, be applied to the transfer-path acquisition procedure performed by the transfer-path-profile acquisition unit 307 of the printer 2903, 2095 or 2903.

Figure 17:
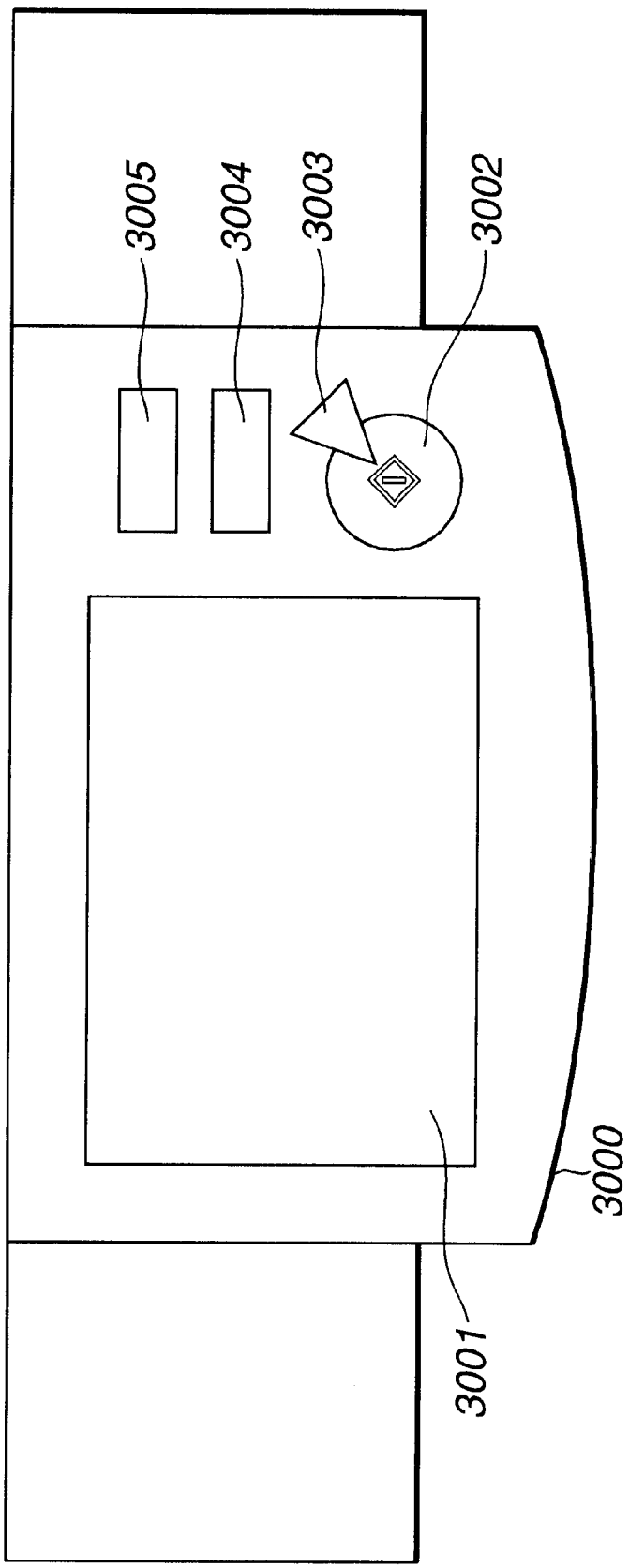
FIG. 17 is a shematic diagram illustrating external appearance of an operation panel 208 of the scanner shown in FIG. 2.

FIG. 17 is a schematic diagram illustrating an appearance of the operation panel 208 of the scanner 102.

As shown in FIG. 17, the operation panel 208 includes an LCD (liquid-crystal display) unit 3001. A touch-panel sheet is attached on the LCD unit 3001 in order to dislay an operation picture frame for the system and, when a displayed key has been depressed, position information relating to the depressed key is transferred and the contents of the operator's operation are determined. A start key 3002 is depressed when starting reading of an image on an original. LEDs having two colors, for example, green and red, are provided at a central portion of the start key 3002. Whether or not the start key 3002 is usable is indicated by the color of the start key 3002. A stop key 3003 is depressed when interrupting the operation of the scanner in operation.

An ID key 3004 is used when inputting a user ID of the user. A reset key 3005 is used when initializing setting from the operation panel 208.

Display picture frames dislayed on the operation panel 208 having the above-described configuration will now be described in detail.

Figure 18:
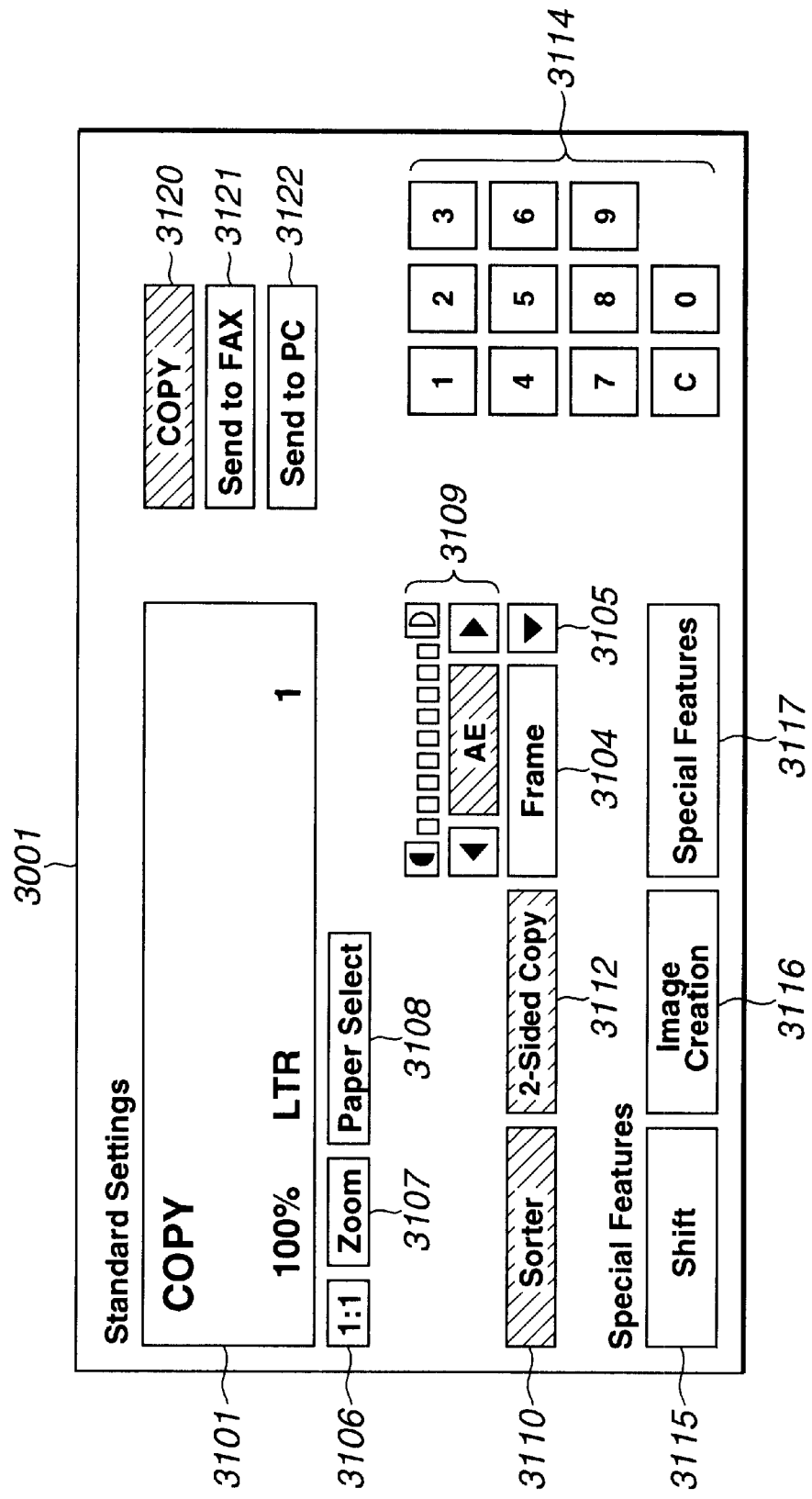
FIG. 18 is a diagram illustrating a display picture frame displayed on an LCD (liquid-crystal display) unit 3001 shown in FIG. 17.

FIG. 18 is a diagram illustrating a display picture frame displayed on the LCD unit 3001. As shown in FIG. 18, operation keys necessary for operating all functions realizable by combining devices currently connected to the network 101 are displayed on the LCD unit 3001.

For example, functions realizable on the multifunction system shown in FIG. 1 are as follows when the functions of respective devices are represented by the device profiles shown in FIGS. 5–7.

Monochromatic copying:
scanner 102→printer 2095, 2902 or 2903
printer 2095→printer 2095, 2902 or 2903
Color copying:
scanner 102→printer 2902
Facsimile transmission:
scanner 102→facsimile device 2904
facsimile device 2904→facsimile device 2904
printer 2095→facsimile device 2904
Facsimile reception:
facsimile device 2904→facsimile device 2904
facsimile device 2904→printer 2902, 2903 or 2095
Binding processing: 20 staples maximum (printer 2095)
Two-sided printing: a two-sided unit (printer 2095)
Sheet size: Letter, Letter-R, Legal, LegalR or Statement Accordingly, a copying-mode key 3120 for performing a remote copying operation on the network 101 to which the scanner 102 is currently connected, a transmission-mode key 3121 for performing facsimile transmission, a scanner-mode key 3122 for transmitting image data read in a client computer (not shown) on the network 101, an image-quality selection key 3105 for selecting a monochromatic mode or a color mode, an image-quality display region 3104 for displaying image quality selected by the image-quality selection key 3105, a copy-parameter display unit 3101 for displaying copy parameters necessary when performing a copying operation, such as the status of the apparatus to be used, the copying magnification, the sheet size, the number of printed copies, and the like, magnification/reduction setting keys 3106 and 3107, a sheet selection key 3108, a sorter setting key 3110, a two-sided-copying setting key 3112, a density indicator and density setting key 3109, and a ten-gidit keypad 3114.

Figure 19:
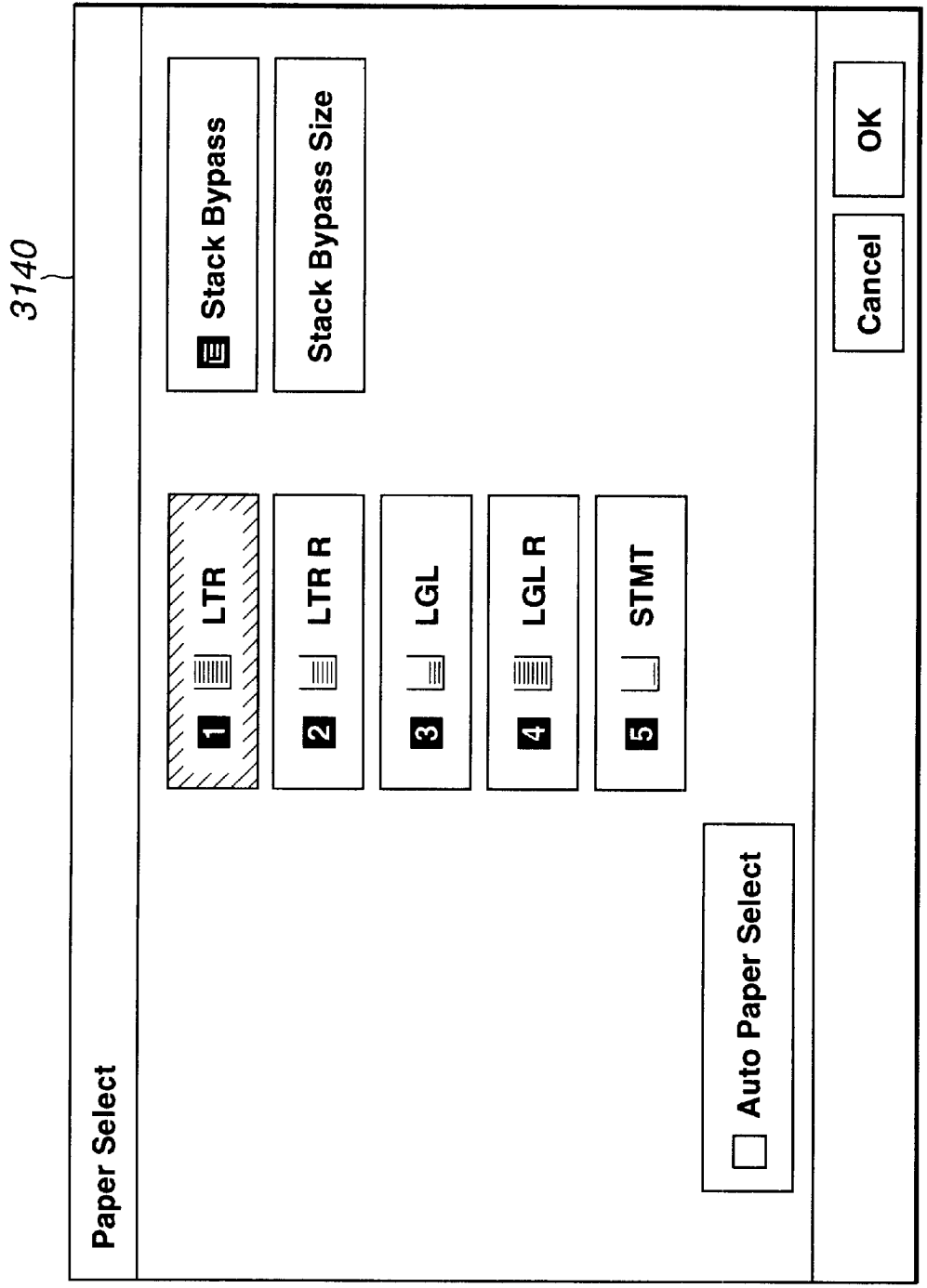
FIG. 19 is a diagram illustrating a sheet selection picture frame displayed on the LCD unit 3001.

When the user has depressed the sheet selection key 3108 shown in FIG. 18, a picture frame shown in FIG. 19 is displayed on the LCD unit 3001. FIG. 19 is a diagram illustrating a sheet selection picture frame dipslayed on the LCD unit 3001. In this picture frame, the contents of display are determined based on "Cassette" information of output devices on the network 101. That is, the sizes of sheets accommodated in sheet cassette stages of all output devices are displayed. By depressing a key displaying the desired sheet size, the user can select a sheet size. In the case of FIG. 19, sheets of five types, i.e., Letter, letterR, Legal, LegalR and Statement, are accommodated within the cassettes of the output devices on the network 101.

For example, when the printer 2095 is in operation, the printer 2095 cannot be immediately used, Hence, keys displaying two types of sheet sizes Legal-R and Statement provided only in the printer 2095 are subjected to shadow diplay or display by another color, and a configuration of prohibiting the user from using these functions is provided. However, it is allowed to perform reservation. When the printer 2095 has completed the current job and become in an operable state, these keys return to the same display state as keys for displaying other sheet sizes, and therefore can be selected. Accordingly, the problem that, when a device is separated from the user and the user cannot know whether or not the device can be used, the user erroneously selects a function provided by the device is prevented, and the user can recognize that the concerned function cannot be currently used by confirming a display indicating the fact.

The system is also configured such that, when sheets of a type are used up and therefore printing output cannot be performed using such sheets, the user cannot select sheets of this type as when a device having sheets of this type is in operation. Furthermore, the system is configured such that, when a color copying operation has been selected, the user cannot select keys indicating sheet sizes other than Letter and Legal which are set in the color printer 2902. Accordingly, the problem that, when the user cannot know whether or not an output device can be used because the output device is separated from the user and error has occurred in the output device, the user erroneously selects a function provided only by the device is prevented.

Since a sorter is connected only to the printer 2095, the sorter cannot be used when the printer 2095 is currently operating for another job. In such a case, the sorter setting key 3110 is displayed with another color (for example, by gray characters) for indicating that the function of the sorter cannot be immediately executed. Upon completion of the currently executed job, this key is changed to ordinary display. When the sorter setting key 3110 is depressed in this state, a picture frame shown in FIG. 20 is displayed on the LCD unit 3001.

Figure 20:
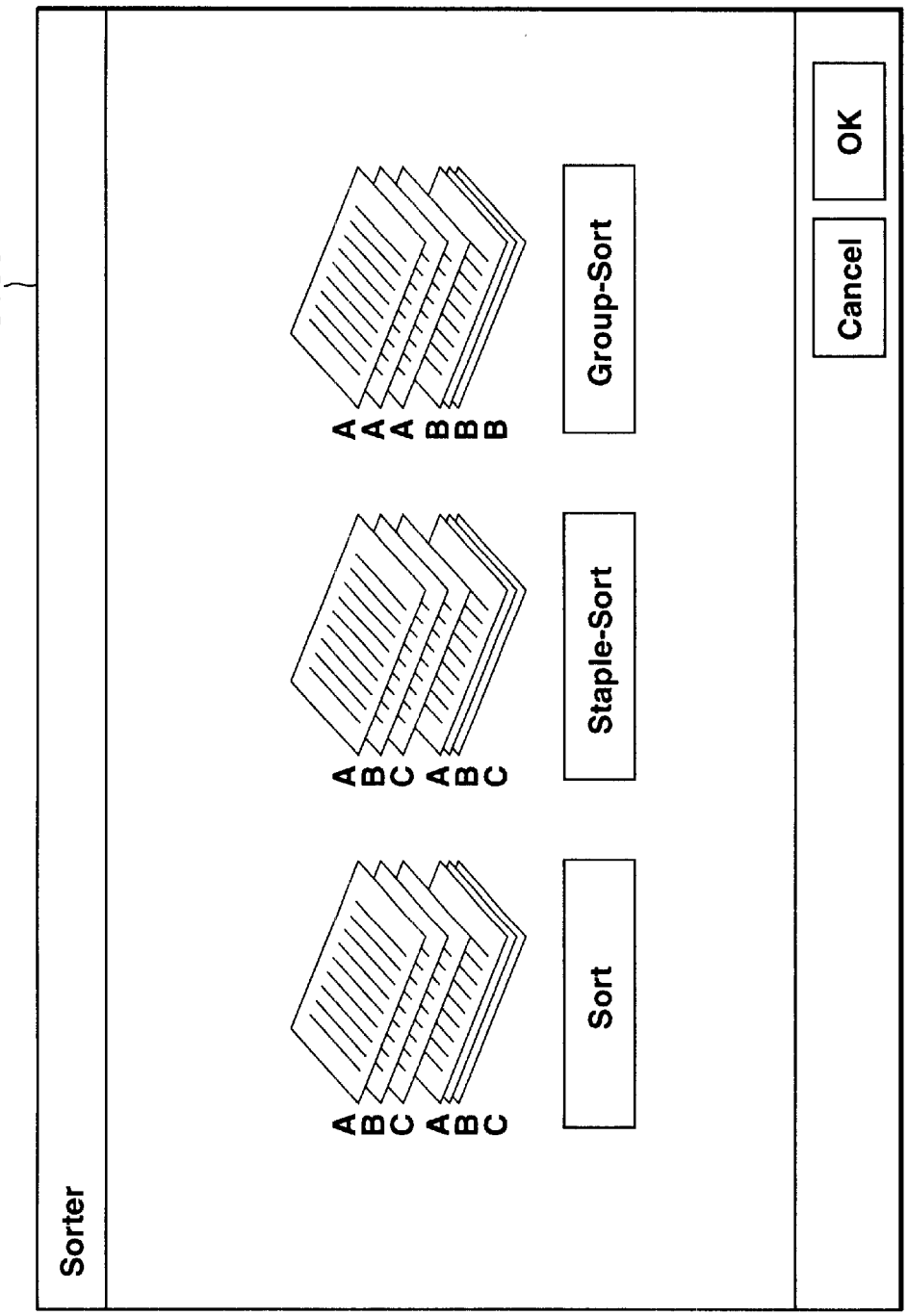
FIG. 20 is a diagram illustrating a sorter selection picture frame displayed on the LCD unit 3001.

FIG. 20 is a diagram illustrating a sorter-selection picture frame displayed on the LCD unit 3001. The sorter of the printer 2095 has the strongest function from among optional binding units connected to output devices on the network 101. Accordingly, when the printer 2095 can be used, as shown as optional functions in FIG. 7, a desired mode can be selected from among three types of modes including stapling sorting.

A two-sided unit is also mounted only in the printer 2095. When the printer 2095 is currently operating for another job, characters on the two-sided-copying setting key 3112 is displayed with another color (for example, gray), indicating that a two-sided-copying operation cannot be immediately executed. Upon completion of the currently executed job, the two-sided-copying setting key 3112 returns to ordinary display. When the user has depressed the two-sided-copying setting key 3112, a picture frame shown in FIG. 21 is displayed on the LCD unit 3001.

Figure 21:
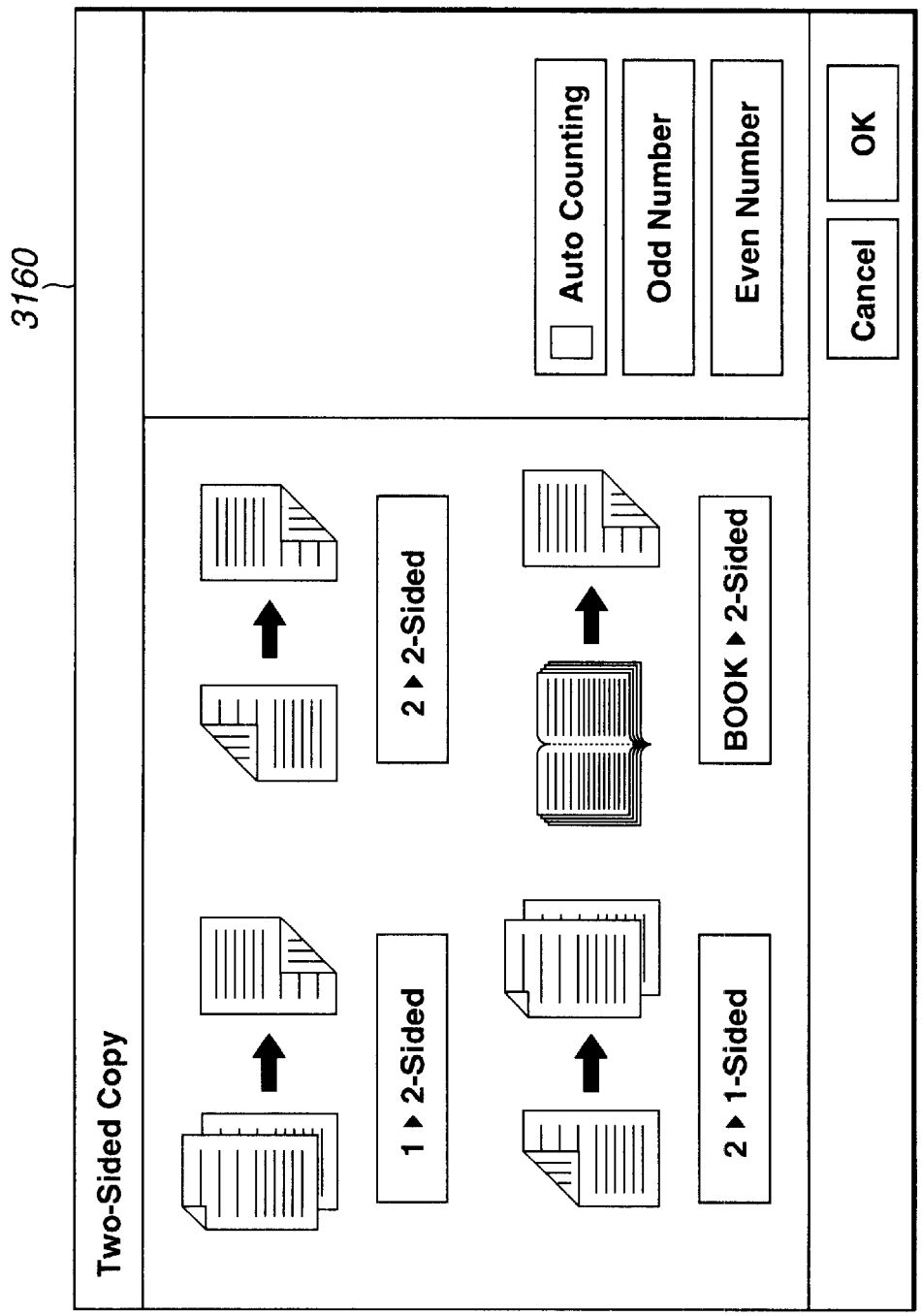
FIG. 21 is a diagram illustrating a two-sided-copying setting picture frame diplayed on the LCD unit 3001.

FIG. 21 is a diagram illustrating a two-sided-copying setting picture frame. As shown in FIG. 21, in this system, a desired mode can be selected from among four types of two-sided copying modes.

Next, a procedure for actually performing printing will be described.

A description will be provided of a case in which the user executes printing output by operating the scanner 102.

First, the user selects a desired function by operating the display picture frame (shown in FIG. 18) displayed on the operation panel 208. By depressing the start key 3002 shown in FIG. 17, a copying function utilizing the selected transfer-path profile is executed. For example, when obtaining only one copy in a monochromatic mode, one of the printers 2095 and 2902, and the facsimile apparatus 2094 may be selected as the output device.

When the user has selected a desired transfer-path profile indicating a monochromatic copying operation, for example, priority is given in the order of the a printer having the highest speed→a printer having the second highest speed→a color printer. Since the printer 2095, serving as the printer having the highest speed, is currently operating for another job, the transfer-path profile for the printer 2903 having the second highest speed is selected.

According to the transfer-path profile shown in FIG. 15, the scanner 102 selects the device at the address "172.16.10.3" written in "output-address" as the output device, reads the original with a resolution level of 600 dpi written in "Resolution" and transmits image data in the LIPS4 format written in "Document-format". Only one copying operation is performed as written in "Copy-default".

Printing data is transferred to the printer 2903 via the network 101. At that time, the printer 2903 performs printing processing for the tranferred image data irrespective of the transfer-path profile. At the input device side, after outputting image data, the output device to which the image data is transmitted is displayed.

As described above, according to the embodiment, device information (a device profile) of each of input devices and output devices connected to the network is acquired by the control server 103. Transfer-path profiles are formed based on the device profiles and are transmitted to each of the input devices and output devices. In each device, all of executable functions are displayed on an operation panel in accordance with the transfer-path profile. Accordingly, the user can easily grasp functions executable on the network, and can use a virtual device realizable by combining devices on the network without moving between devices having necessary functions. For example, when intending to perform printing output of image data read by a scanner present at hand using an output device remote from the user, all functions usable at that time are displayed on the operation panel. Hence, it is possible to easily set a desired function as if a single device is used, and to improve the operability of devices. Furthermore, since all functions which can be obtained on the network are automatically determined and are displayed, the user can use the system without being aware of the combination of devices, and the man-machine interface can be further improved. The number of devices to be combined is not limited to two. At least three devices may also be combined. For example, three devices are combined such that image data input to an image input device is transferred to another device which converts the format of the image data into another format, and the resultant image data is transferred to an image output device which outputs the image data.

A combination is possible not only of an image input device and an image output device, but is also possible in a case in which image data is transferred from an image output device to another image output device.

Next, another display picture frame of the LCD unit 3001 will be described.

Figure 22:
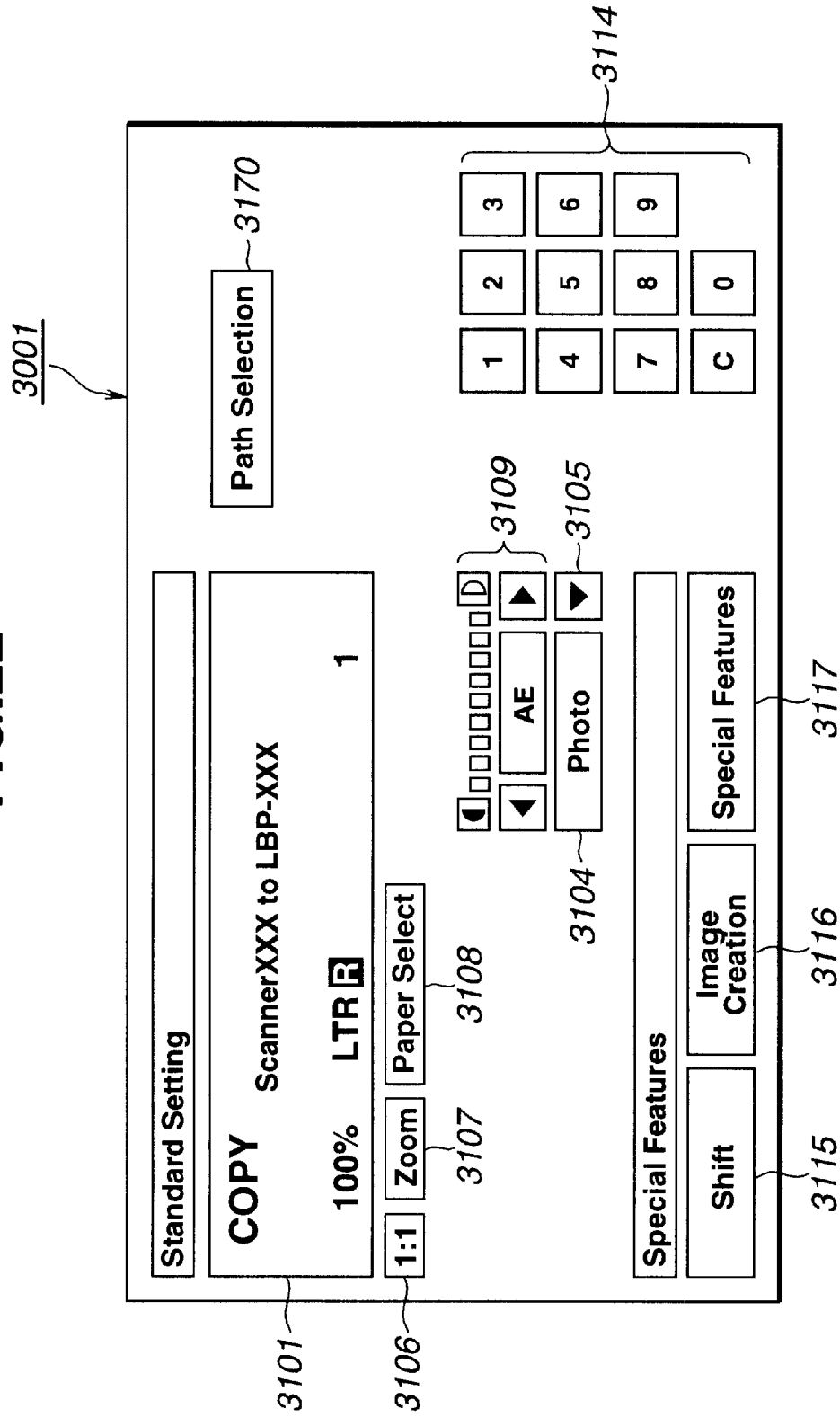
FIG. 22 is a diagram illustrating a copying-mode displaying picture frame displayed on the LCD 3001.

FIG. 22 is a copying picture frame (initial picture frame) on the LCD unit 3001 of the network scanner 102.

This picture frame is displayed when a copying mode has been assigned on the operation panel 208. There is a FAX (facsimile) mode and the like in addition to the copying mode.

Copying in this embodiment is a concept including both a function of copying a document using a scanner and a printer possessed by the user's device (local copying), and a function of copying a document using the scanner of the user's device and a printer connected to the network (remote copying).

By depressing the display position of an image-path selection key 3170 in the copying picture frame shown in FIG. 22, it is determined that an input operation on the image-path selection key 3170 has been performed, and processing of selecting a transfer-path profile is performed. The display on a panel display unit 3101 shown in FIG. 22 indicates the contents of the panel display when the image-path selection key 3170 has been first depressed. In this case, a character string "COPY ScannerXXX to LBPXXX" indicated in "Description" shown in FIG. 12 is displayed on the panel display unit 3101, indicating that the transfer-path profile shown in FIG. 12 is selected.

If a plurality of transfer-path profiles are registered in the network scanner 102, another transfer-path profile is selected by further depressing the image-path selection key 3170. Thus, it is possible to select another transfer-path profile as displayed on the panel display unit 3101.

By depressing the start key 3002 shown in FIG. 17 when the picture frame shown in FIG. 22 is displayed, the scanner is started, and an object to be copied (an image based on image data from the scanner) corresponding to respective setting parameters displayed on the picture frame is subjected to printing output from the selected printer.

The main picture frame shown in FIG. 22 includes an image-quality selection button 3105 for selecting one of a character mode and a photographing mode, an image-quality display region 3104 for dipslaying the image quality selected by the image-quality selection button 3105, a copying-parameter display unit 3101 for displaying the status of the device, the copying magnification, the sheet size, and the number of copies, magnification/reduction setting buttons 3106 and 3107, a sheet selection button 3108, a density indicator and density setting button 3109, and a ten-digit keypad 3114.

Figure 23:
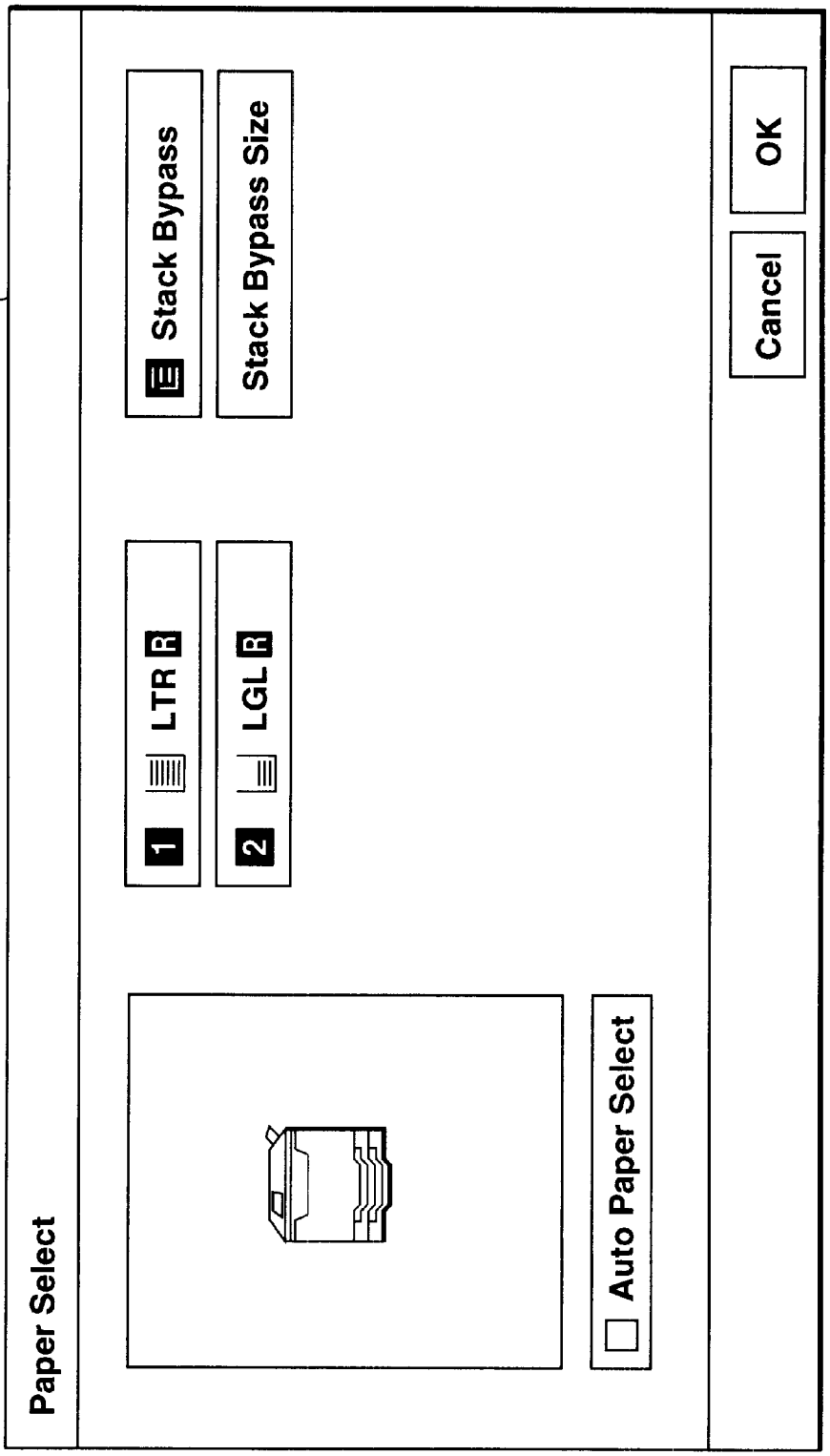
FIG. 23 is a diagram illustrating a sheet selection picture frame displayed on the LCD unit 3001.

On the display picture frame shown in FIG. 22, when the sheet selection button 3108 has been depressed, a picture frame shown in FIG. 23 appears. FIG. 23 is a diagram illustrating a sheet selection picture frame on the LCD unit 3001 of the network scanner 102 in the embodiment.

On the sheet selection picture frame shown in FIG. 23, a display is performed based on "Cassette" information shown in FIG. 6. In FIG. 23, the sizes of sheets accommodated in two-stage cassettes of the printer 2903 (LBP-XXX) are displayed, and a desired size (cassette) can be selected.

Figure 24:
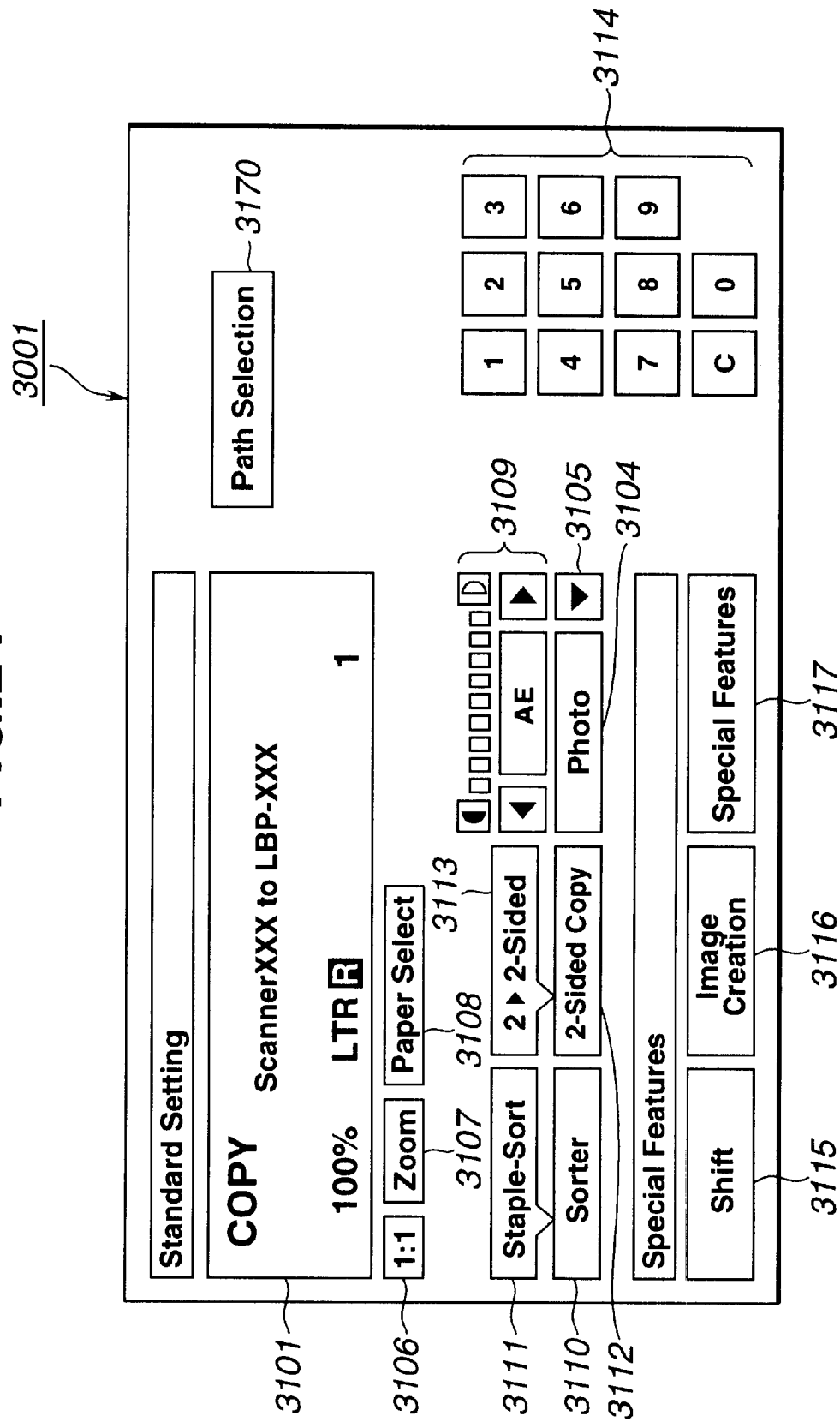
FIG. 24 is a diagram illustrating a copying-mode displaying picture frame displayed on the LCD unit 3001.

Next, a description will be provided of a copying picture frame when a transfer-path profile has been selected. FIG. 24 is a diagram illustrating the display of a copying picture frame when a transfer-path profile in the embodiment has been selected. FIG. 24 differs from FIG. 22 in that the transfer-path profile has been selected.

FIG. 24 indicates that a remote copying mode using the printer GP-XXX which corresponds to the printer 2095 shown in FIG. 1 has been selected using the image-path selection key 3120. Accordingly, the panel displays "COPY ScannerXXX to GP-XXX".

In contrast to the display shown in FIG. 22, in the display shown in FIG. 24, a sorter and a two-side copying unit are mounted as optional devices in the printer GP-XXX 2095 shown in FIG. 1. Hence, a sorter setting button 3110 and a two-sided copying setting button 3112 are added.

Figure 25:
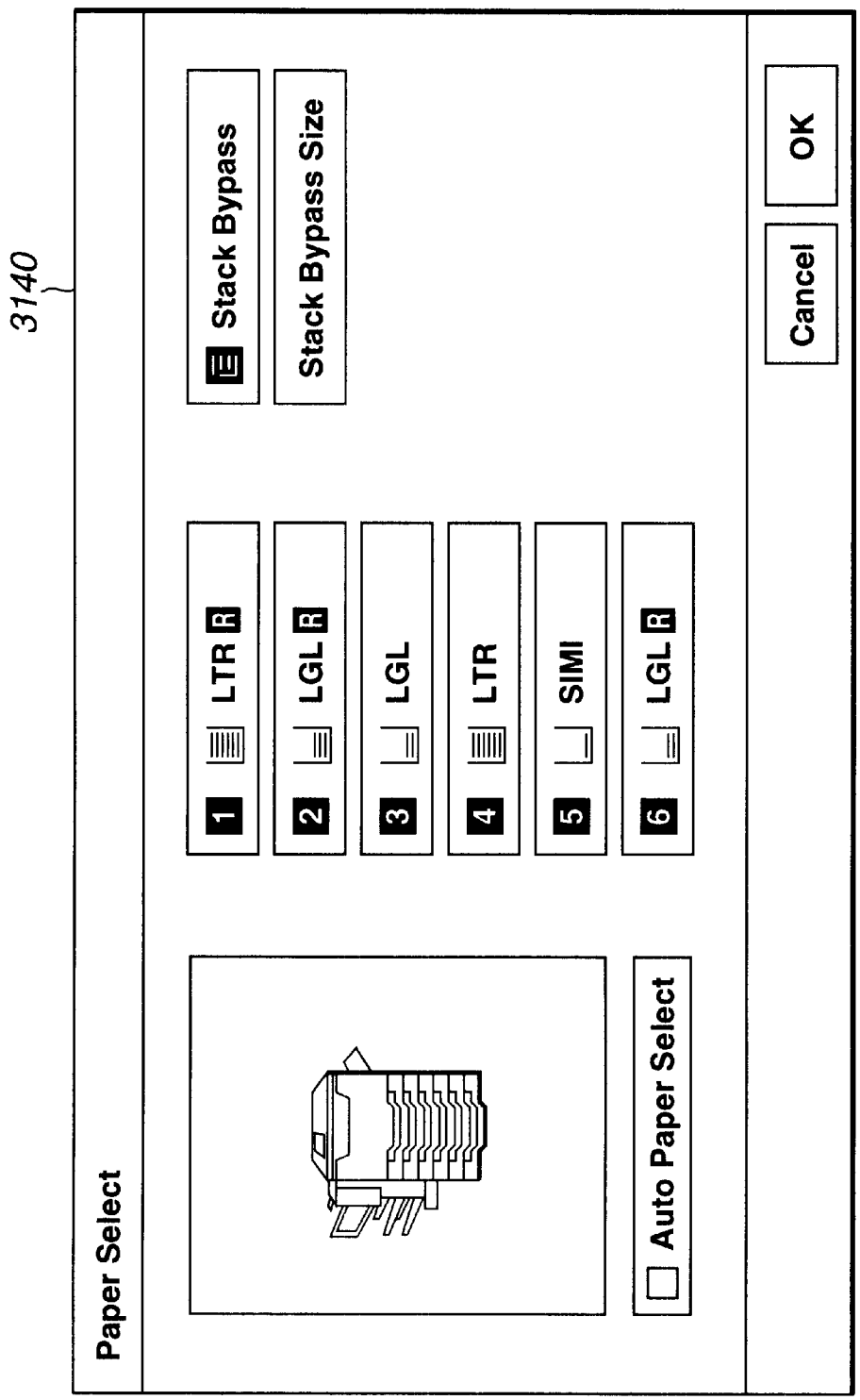
FIG. 25 is a diagram illustrating a sheet selection picture frame displayed on the LCD unit 3001.

By depressing the sheet selection button 3108, a picture frame shown in FIG. 25 appears. FIG. 25 is a diagram illustrating the display of a sheet selection picture frame when a transfer-path profile in the embodiment has been selected.

In FIG. 25, a display is performed based on "Cassette" information shown in FIG. 7. That is, the sizes of sheets accommodated in six-stage cassettes are displayed, and a size (cassette) can be selected.

Figure 26:
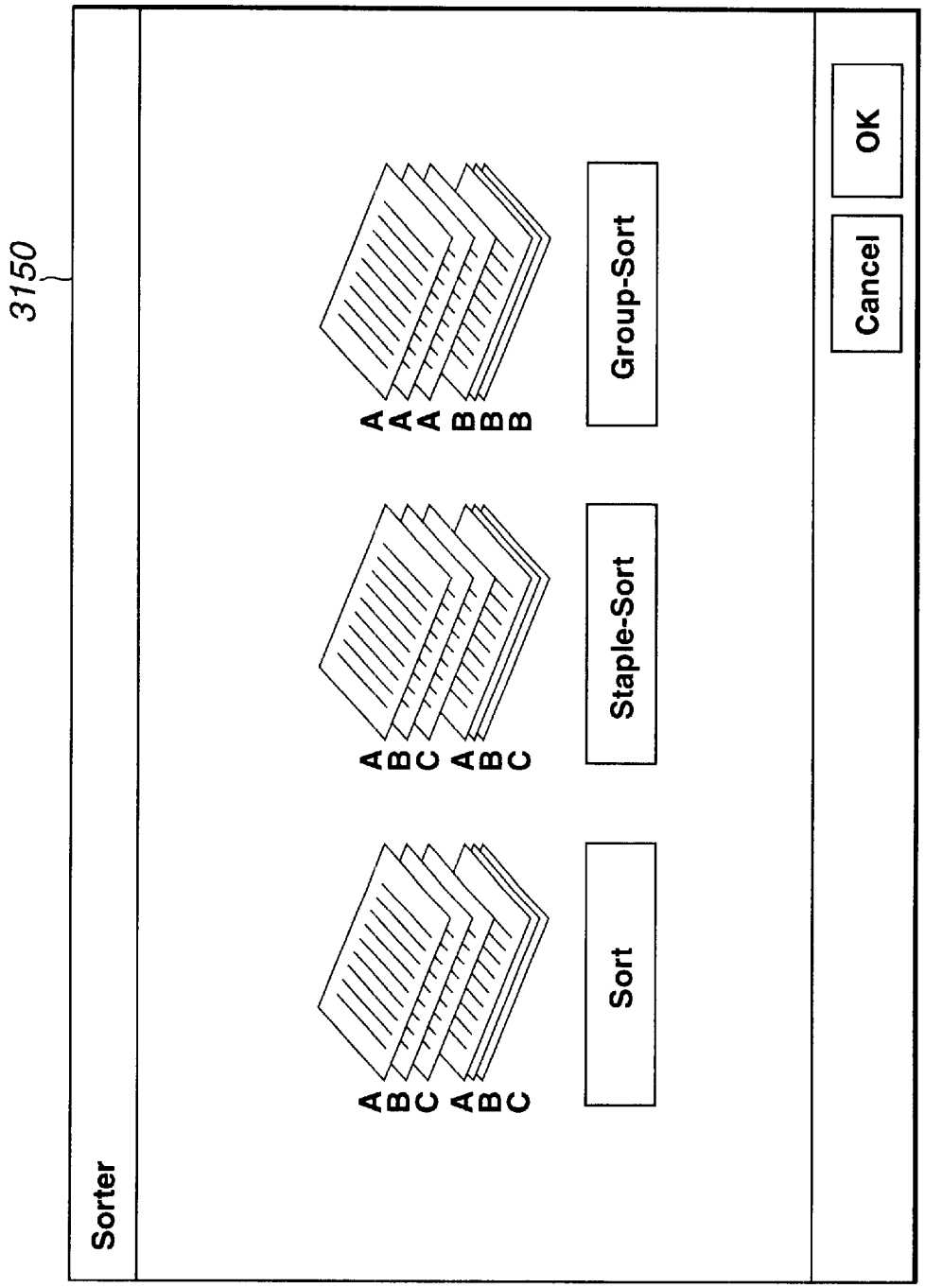
FIG. 26 is a diagram illustrating a sorter selection picture frame displayed on the LCD unit 3001.

By depressing the sorter setting button 3110, a sorter setting picture frame shown in FIG. 26 is displayed. FIG. 26 is a diagram illustrating the display of a sorter setting picture frame when a transfer-path profile in the embodiment has been selected.

Figure 27:
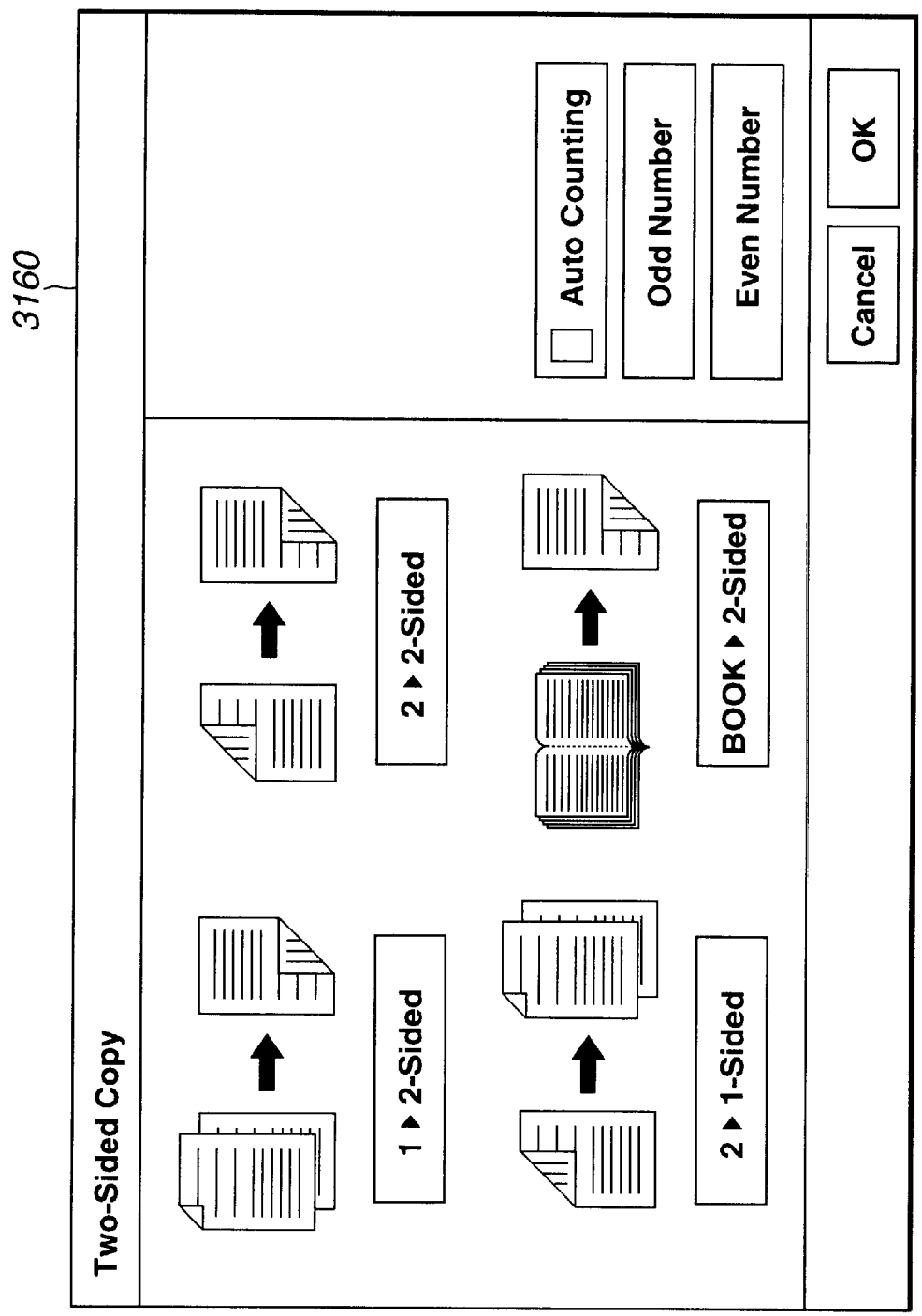
FIG. 27 is a diagram illustrating a two-sided-copying setting picture frame diplayed on the LCD unit 3001.

In the embodiment, as shown in "Option" information shown in FIG. 7, a sorter capable of performing stapling is provided. Hence, a stapling function can be selected. By selecting the two-sided-copying setting button 3112, a two-sided-copying setting picture frame shown in FIG. 27 is displayed. FIG. 27 is a diagram illustrating the display of a two-sided-copying setting picture frame when a transfer-path profile in the embodiment has been selected. On the display picture frame shown in FIG. 24, a two-sided copying mode can be selected.

Copying Process

Next, a process for actually performing copying (printing) in the embodiment will be described.

The user stands in front of the network scanner 102, sets an original thereon, and performs copying (printing) by operating the operation panel of the network scanner 102.

First, a function to be performed is selected using the image-path selection key 3120. That is, a desired function is selected from transfer-path profiles. By depressing the start key 3002 shown in FIG. 17, a copying function utilizing the corresponding transfer-path profile is executed.

According to the transfer-path profile shown in FIG. 15, the network scanner 102 selects "172.16.10.3" written in "output-address" as the output device.

Then, the original is read with a resolution level of 600 dpi written in "Resolution". Then, read data is converted into printing data in the LIPS4 format written in "Document-format", and the generated printing data is transmitted. Copying operations corresponding to the number written in "Copy-default" (once in this case) are performed. This setting can be changed by an operation from the operation panel.

The printing data is transferred to the network printer 2903 via the network 101. At that time, the network printer 2903 performs printing processing of the transferred printing data irrespective of the transfer-path profile.

Processing other than copying may also be executed according to a similar procedure.

As described above, according to the embodiment, a control server can obtain device information relating to input devices and output devices connected to a network. By forming and registering transfer-path profiles having multiple functions obtained by combining the input devices and the output devices by the control server, it is possible to transfer transfer-path profiles to a desired device and display-executable fucntions on an operation panel of the device.

Accordingly, the user can display functions executable by the system on a display picture frame of the desired device, and can use a virtual device obtained by combining devices on the network, without moving from the current location.

That is, the user can perform facsimile transmission via a remote facsimile device on the network from a scanner near the user with a simple operation. Similarly, for example, it is possible to transmit an image from a scanner present at hand to a high-speed printer installed in a copying room, and perform printing of 200 copies subjected to binding processing, with a simple operation.

By automatically determining functions executable by combining devices and displaying only functions which can be used at a certain time according to the above-described approach, the operability of devices can be improved. Since functions capable of being executed in the system are displayed, the user can instantaneously determine a desired combination.

Information registered in a profile is not limited to the above-described one. For example, various kinds of information, such as the location of a device on a floor, and the like, may be registered and reflected on the display.

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may, of course, also be achieved by supplying a system or an apparatus with a storage medium storing program codes of software for realizing the functions of the above-described embodiment, and reading and executing the program codes stored in the storage medium by means of a computer (or a CPU or an MPU (microprocessor unit)) of the system or the apparatus.

In such a case, the program codes themselves read from the storage medium realize the functions of the above-described embodiment, so that the storage medium storing the program codes constitutes the present invention.

For example, a floppy disk, a hard disk, an optical disk, a magnetooptical disk, a CD(compact disc)-ROM, a CD-R (recordable), a magnetic tape, a nonvolatile memory card, a ROM or the like may be used as the storage medium for supplying the program codes.

The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-descibed embodiment are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiment are realized by the processing.

When applying the present invention to the storage medium, program codes corresponding to the above-described flowcharts are stored in the storage medium.

The individual components shown in outline or designated by blocks in the drawings are all well known in the data processing apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A controlling method in a data processing system having a server and a plurality of data processing terminals, said method comprising:

a gathering step of gathering function information indicating a function of each of the plurality of data processing terminals from a corresponding one of the plurality of data processing terminals;

a first storing step of storing the gathered function information in a first database of the server;

a producing step of producing a transfer-path profile indicating each function realizable by combining some of the plurality of data processing terminals, based on the function information gathered in said gathering step;

a second storing step of storing the transfer-path profile in a second database of the server; and a transferring step of transferring the transfer-path profile produced in said producing step from the second database to one or more terminals of the plurality of data processing terminals, upon request from the one or more terminals.

2. A controlling method according to claim 1, wherein the transfer-path profile produced in said producing step comprises a setting indicating a function realizable by an image input terminal and an image output terminal of the data processing system.

3. A controlling method according to claim 1, wherein the function information gathered in said gathering step includes information indicating an image processing function processable by at least one of the plurality of data processing terminals.

4. A controlling method according to claim 1, wherein the transfer-path profile produced in said producing step includes information for specifying a subset of the plurality of data processing terminals.

5. A controlling method according to claim 4, wherein the information for specifying the subset of the plurality of data processing terminals comprises information indicating an ID of each data processing terminal of the subset of the plurality of data processing terminals.

6. A controlling method according to claim 4, wherein the information for specifying the subset of the plurality of data processing terminals comprises information indicating a location of each data processing terminal of the subset of the plurality of data processing terminals.

7. A data processing apparatus comprising:

a connection unit adapted to connect to an external data processing apparatus;

a reception unit adapted to receive function information indicating a function of the external data processing apparatus connected via said connection unit; and a display unit adapted to display a function realizable by combination of said data processing apparatus with the external data processing apparatus on a display monitor thereof, based on the function information received by said reception unit.

8. A data processing apparatus according to claim 7, wherein said connection unit connects to a plurality of external data processing apparatuses, and wherein said reception unit receives function information of each of the plurality of external data processing apparatuses.

9. A data processing apparatus according to claim 7, wherein said display unit controls the display monitor in accordance with a status of the external data processing apparatus connected to said connection unit.

10. A data processing apparatus according to claim 7, wherein said display unit displays on the display monitor a function realizable by combining a function of said data processing apparatus with the function of the external data processing apparatus.

11. A data processing apparatus according to claim 7, wherein said reception unit receives information indicating an image processing function processable by the external data processing apparatus.

12. A data processing apparatus according to claim 7, the information received by said reception unit includes information specifying the external data processing apparatus.

13. A data processing apparatus according to claim 12, wherein the information specifying the external data processing apparatus comprises information indicating an ID of the external data processing apparatus.

14. A data processing apparatus according to claim 12, wherein the information specifying the external data processing apparatus comprises information indicating a location of the external data processing apparatus.

15. A method for controlling a data processing apparatus connected to an external data processing apparatus, said method comprising:

a receiving step of receiving function information indicating a function of the external data processing apparatus; and a displaying step of displaying a function realizable by combining the data processing apparatus with the external data processing apparatus, based on the function information received in said receiving step.

16. A computer-readable program, stored in a storage medium, for implementing a method of controlling a data processing apparatus connected to an external data processing apparatus, the method comprising:

a receiving step of receiving function information indicating a function of the external data processing apparatus; and a displaying step of displaying a function realizable by combining the data processing apparatus with the external data processing apparatus, based on the function information received in said receiving step.

* * * * *

UNITED STATES PATENT AND TRADEMARK OFFICE
CERTIFICATE OF CORRECTION

PATENT NO. : 6,609,162 B1
DATED : August 19, 2003
INVENTOR(S) : Hideaki Shimizu et al.

It is certified that error appears in the above-identified patent and that said Letters Patent is hereby corrected as shown below:

Column 1,
Line 10, "connectable" should read -- connectable to --.

Column 2,
Lines 25 and 34, "an" should read -- to an --.

Column 3,
Line 25, "shematic" should read -- schematic --.

Column 6,
Line 2, "tranfer-path" should read -- transfer-path --.

Column 7,
Line 25, "ESC IP" should read -- ESC/P --.

Column 8,
Line 45, "2903" should read -- 2902 --.

Column 10,
Line 36, "tranfer of a tranfer-path" should read -- transfer of a transfer-path --.
Line 44, "2903" should read -- 2902 --.
Line 45, "a" should be deleted.

Column 11,
Line 5, "for" should read -- of --.
Line 8, "2903" should read -- 2902 --.

Column 12,
Line 7, "ten-gidit" should read -- ten digit --.

Column 16,
Line 14, "fucntions" should read -- functions --.

UNITED STATES PATENT AND TRADEMARK OFFICE
CERTIFICATE OF CORRECTION

PATENT NO.     : 6,609,162 B1
DATED          : August 19, 2003
INVENTOR(S)    : Hideaki Shimizu et al.

It is certified that error appears in the above-identified patent and that said Letters Patent is hereby corrected as shown below:

<u>Column 18,</u>
Line 34, "the" should read -- wherein the --.

Signed and Sealed this

Sixth Day of April, 2004

JON W. DUDAS
*Acting Director of the United States Patent and Trademark Office*